(12) United States Patent
Liao

(10) Patent No.: US 12,028,298 B2
(45) Date of Patent: *Jul. 2, 2024

(54) SYSTEM FOR SHARING MAIL FOR GROUP COLLABORATION

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,549

(22) Filed: Jul. 29, 2022

(65) Prior Publication Data

US 2022/0368656 A1    Nov. 17, 2022

Related U.S. Application Data

(63) Continuation of application No. PCT/CN2021/090118, filed on Apr. 27, 2021.

(30) Foreign Application Priority Data

Apr. 30, 2020  (CN) .......................... 202010366966.2
Apr. 30, 2020  (CN) .......................... 202010368146.7

(51) Int. Cl.
  *H04L 51/046*  (2022.01)
  *H04L 51/066*  (2022.01)

(52) U.S. Cl.
  CPC .......... *H04L 51/046* (2013.01); *H04L 51/066* (2013.01)

(58) Field of Classification Search
  None
  See application file for complete search history.

(56) References Cited

U.S. PATENT DOCUMENTS 6,456,303 B1 *   9/2002   Walden ................... G06F 9/453
                                                   715/788
7,330,895 B1 *   2/2008   Horvitz ............. H04M 3/42229
                                                   709/227

(Continued)

FOREIGN PATENT DOCUMENTS

CN      103984887 A     8/2014
CN      104219214 A    12/2014

(Continued)

OTHER PUBLICATIONS

Search Report in CN Application No. 2020103669662 dated Aug. 26, 2022 (4 Pages).

(Continued)

*Primary Examiner* — Backhean Tiv

(57) ABSTRACT

Provided are an information interaction method and apparatus, and a non-transitory computer-readable storage medium. The information interaction method includes: receiving a mail sharing request sent by a sharer party based on a target mail; creating a sharing group including the sharer party and a sharee party and sharing the target mail with the sharee party according to the mail sharing request, to enable the sharer party and the sharee party to perform, based on the target mail, information interaction in the sharing group.

28 Claims, 11 Drawing Sheets

(56) References Cited

U.S. PATENT DOCUMENTS

| | | | | |
|---|---|---|---|---|
| 7,437,421 B2* | 10/2008 | Bhogal | G06F 40/166 | 709/205 |
| 7,512,407 B2* | 3/2009 | Wu | H04W 4/12 | 455/518 |
| 8,634,858 B1* | 1/2014 | Jackson | H04W 4/023 | 709/201 |
| 8,700,101 B2* | 4/2014 | Yamashita | H04M 19/04 | 455/412.2 |
| 9,047,261 B2* | 6/2015 | Bowling | G06F 40/143 | |
| 9,100,218 B2* | 8/2015 | Green | H04L 51/224 | |
| 9,240,962 B2* | 1/2016 | Jung | H04L 12/1818 | |
| 9,311,626 B2* | 4/2016 | McCaffrey | G06Q 10/107 | |
| 9,363,135 B1* | 6/2016 | Merom | G06Q 50/01 | |
| 9,420,013 B1* | 8/2016 | van Rensburg | G06F 3/04847 | |
| 9,438,546 B2* | 9/2016 | Chan | H04L 51/08 | |
| 9,479,469 B2* | 10/2016 | Kabbes | H04W 4/12 | |
| 9,729,672 B2* | 8/2017 | Hammersley | H04L 67/01 | |
| 9,753,817 B2* | 9/2017 | Jain | G06F 11/0751 | |
| 9,773,119 B2* | 9/2017 | Sinha | H04L 63/083 | |
| 9,875,239 B2* | 1/2018 | Victor | G06F 16/176 | |
| 10,089,289 B2* | 10/2018 | Sood | G06F 3/03543 | |
| 10,129,264 B2* | 11/2018 | Chao | H04L 67/1097 | |
| 10,171,397 B2* | 1/2019 | Della Corte | H04L 51/214 | |
| 10,277,643 B2* | 4/2019 | Lee | G06F 3/04847 | |
| 10,291,664 B2* | 5/2019 | French | H04L 51/56 | |
| 10,404,637 B2* | 9/2019 | Masterson | H04L 51/02 | |
| 10,404,639 B2* | 9/2019 | Moon | H04L 12/185 | |
| 10,437,451 B2* | 10/2019 | Zhang | G06F 3/04817 | |
| 10,466,882 B2* | 11/2019 | Masterson | G06F 3/04847 | |
| 10,523,613 B1* | 12/2019 | Alm | G06Q 10/107 | |
| 10,970,349 B1* | 4/2021 | Gutierrez | G06F 7/32 | |
| 11,328,116 B2* | 5/2022 | Meling | G06N 20/00 | |
| 11,522,924 B2* | 12/2022 | Wang | H04L 65/4015 | |
| 11,706,170 B2* | 7/2023 | Liao | H04L 51/046 | 709/206 |
| 11,716,299 B2* | 8/2023 | Liao | H04W 4/12 | 709/206 |
| 11,765,122 B2* | 9/2023 | Liao | H04L 51/42 | 709/206 |
| 11,888,807 B2* | 1/2024 | Liao | H04L 51/046 | |
| 2002/0099777 A1* | 7/2002 | Gupta | G06Q 10/107 | 709/206 |
| 2004/0237045 A1* | 11/2004 | Meltzer | G06Q 10/10 | 715/255 |
| 2005/0033811 A1* | 2/2005 | Bhogal | G06Q 40/00 | 709/206 |
| 2005/0033813 A1* | 2/2005 | Bhogal | G06Q 10/10 | 709/206 |
| 2005/0210392 A1* | 9/2005 | Koide | G06F 40/169 | 715/255 |
| 2005/0246663 A1* | 11/2005 | Yeung | G06F 16/10 | 715/779 |
| 2006/0095514 A1* | 5/2006 | Wang | H04L 51/04 | 709/204 |
| 2006/0265454 A1* | 11/2006 | Forlenza | H04L 51/04 | 709/206 |
| 2007/0208815 A1* | 9/2007 | Jania | G06Q 10/107 | 709/206 |
| 2009/0055483 A1* | 2/2009 | Madan | H04L 51/04 | 709/206 |
| 2009/0064284 A1 | 3/2009 | Poston et al. | | |
| 2011/0010635 A1* | 1/2011 | Fox | G06Q 10/10 | 715/744 |
| 2011/0026898 A1* | 2/2011 | Lussier | G11B 27/034 | 386/280 |
| 2011/0314384 A1* | 12/2011 | Lindgren | G06Q 10/107 | 715/739 |
| 2012/0072821 A1* | 3/2012 | Bowling | G06F 40/143 | 715/229 |
| 2012/0151377 A1 | 6/2012 | Schultz et al. | | |
| 2013/0018964 A1* | 1/2013 | Osipkov | H04L 67/306 | 709/206 |
| 2013/0080545 A1* | 3/2013 | Datta | H04L 51/18 | 709/206 |
| 2013/0124660 A1* | 5/2013 | Lao | H04L 51/00 | 709/206 |
| 2013/0151633 A1* | 6/2013 | Hazarika | H04L 51/52 | 709/206 |
| 2013/0198304 A1* | 8/2013 | Jung | H04L 12/1818 | 709/206 |
| 2013/0246474 A1* | 9/2013 | Victor | G06F 16/93 | 707/E17.005 |
| 2014/0096266 A1* | 4/2014 | Hoard | H04L 63/168 | 726/28 |
| 2014/0172997 A1* | 6/2014 | Chan | H04L 51/04 | 709/206 |
| 2014/0280566 A1* | 9/2014 | Chen | H04L 51/52 | 709/204 |
| 2014/0368333 A1* | 12/2014 | Touloumtzis | H04L 67/54 | 340/505 |
| 2015/0007053 A1* | 1/2015 | Vitaldevara | G06Q 10/107 | 715/752 |
| 2015/0121202 A1* | 4/2015 | Saund | H04L 51/10 | 715/249 |
| 2015/0256353 A1* | 9/2015 | Busey | H04L 63/0421 | 715/758 |
| 2015/0277725 A1* | 10/2015 | Masterson | G06F 3/04842 | 715/753 |
| 2015/0281148 A1* | 10/2015 | Masterson | G06F 3/0482 | 715/752 |
| 2015/0281149 A1* | 10/2015 | Masterson | H04L 51/046 | 715/752 |
| 2015/0341401 A1* | 11/2015 | Lee | G06Q 10/101 | 715/753 |
| 2016/0087924 A1* | 3/2016 | Ramalingam | H04L 51/04 | 709/206 |
| 2016/0315894 A1* | 10/2016 | Della Corte | H04L 51/214 | |
| 2016/0337277 A1* | 11/2016 | Dong | H04L 51/046 | |
| 2016/0357971 A1* | 12/2016 | Sinha | H04L 63/10 | |
| 2016/0380943 A1* | 12/2016 | van Rensburg | G06F 3/0482 | 709/206 |
| 2017/0024426 A1* | 1/2017 | Kazama | G06F 40/197 | |
| 2017/0214641 A1* | 7/2017 | Mishra | G06F 40/166 | |
| 2017/0373996 A1* | 12/2017 | Danesh-Bahreini | H04L 51/046 | |
| 2019/0272071 A1* | 9/2019 | Greenberger | G06F 16/93 | |
| 2021/0142000 A1* | 5/2021 | Vis | G06F 40/169 | |
| 2021/0326436 A1* | 10/2021 | West | G06F 21/567 | |
| 2022/0200940 A1* | 6/2022 | Liao | H04L 51/56 | |
| 2022/0368656 A1* | 11/2022 | Liao | H04L 51/56 | |
| 2022/0368666 A1* | 11/2022 | Liao | H04L 51/42 | |
| 2022/0385600 A1* | 12/2022 | Liao | G06F 40/166 | |
| 2022/0385618 A1* | 12/2022 | Liao | H04L 51/48 | |
| 2022/0391577 A1* | 12/2022 | Liao | H04L 12/1827 | |
| 2022/0394002 A1* | 12/2022 | Liao | H04L 51/42 | |
| 2023/0014265 A1* | 1/2023 | Liao | H04L 51/046 | |
| 2023/0388265 A1* | 11/2023 | Liao | H04L 51/046 | |

FOREIGN PATENT DOCUMENTS

| | | |
|---|---|---|
| CN | 104268667 A | 1/2015 |
| CN | 106230699 A | 12/2016 |
| CN | 107733662 A | 2/2018 |
| CN | 108055196 A | 5/2018 |
| CN | 108055197 A | 5/2018 |
| CN | 108156070 A | 6/2018 |
| CN | 108306810 A | 7/2018 |
| CN | 109302295 A | 2/2019 |
| CN | 110661698 A | 1/2020 |
| CN | 110855547 A | 2/2020 |
| JP | 2010061476 A | 3/2010 |
| KR | 101839050 B1 | 3/2018 |

OTHER PUBLICATIONS

International Search Report dated Jul. 20, 2021 in International Application No. PCT/CN2021/090118.

(56) References Cited

OTHER PUBLICATIONS

First Office Action dated Apr. 6, 2022 in Chinese Patent Application No. 202010368146.7 (14 pages) with an English translation (14 pages).
Dongming et al., "Multimedia Document Oriented Cooperative Editing System Key Technology Research," Journal of China Institute of Communications, vol. 20, No. 9, Sep. 1999, with an English translation (6 pages).
Jiang et al., "Analysis and Design of an Online Collaborative Editing Systems on CSCW," IEEE, 2011 International Conference on Multimedia Technology, pp. 490-493, 2011.
First Office Action dated Mar. 3, 2022 in Chinese Patent Application No. 2202010366966.2 (11 pages) with an English translation (8 pages).
EP Search Report dated May 11, 2023 in EP Appl. No. 23154311.7 (4 pages).
Examination Report dated Nov. 21, 2023 in EP Appl. No. 23154311.7 (5 pages).
Notice of Reasons for Refusal dated Oct. 2, 2023 in JP Appl. No. 2022-563134, English translation (8 pages).

\* cited by examiner

SYSTEM FOR SHARING MAIL FOR GROUP COLLABORATION

CROSS REFERENCE TO RELATED APPLICATIONS

This is continuation of International Patent Application No. PCT/CN2021/090118, filed on Apr. 27, 2021, which is based on and claims priority to Chinese Patent Application No. 202010368146.7 filed with the China National Intellectual Property Administration (CNIPA) on Apr. 30, 2020 and Chinese Patent Application No. 202010366966.2 filed with the CNIPA on Apr. 30, 2020, the disclosures of which are incorporated herein by reference in their entireties.

TECHNICAL FIELD

The present disclosure relates to the field of computer technologies, for example, to an information interaction method and apparatus, and a non-transitory computer-readable storage medium.

BACKGROUND

With the development of computer technologies, email has become one of the necessary tools for work communication in every industry. For mails that require multi-party collaborative communication, how to improve communication efficiency is an urgent problem to be solved for improving work efficiency.

In the related art, when a sharer needs to conduct multi-party discussion and communication based on a mail, the manner generally used is to forward the mail to each sharee party, and then communicate with multiple sharee parties one by one or hold an offline face-to-face meeting for discussion, which has low efficiency.

SUMMARY

The present disclosure provides an information interaction method and apparatus, and a non-transitory computer-readable storage medium, so as to improve the information interaction efficiency of multi-party collaborative communication.

An information interaction method is provided and includes steps described below.

A mail sharing request sent by a sharer party based on a target mail is received.

A sharing group including the sharer party and a sharee party is created and the target mail is shared with the sharee party according to the mail sharing request, to enable the sharer party and the sharee party to perform, based on the target mail, information interaction in the sharing group.

An information interaction apparatus is further provided and includes at least one processing apparatus; and a storage apparatus configured to store at least one program; where the at least one program, when executed by the at least one processing apparatus, causes the at least one processing apparatus to comprising a request reception module and a sharing group creation module.

The request reception module is configured to receive a mail sharing request sent by a sharer party based on a target mail.

The sharing group creation module is configured to create a sharing group including the sharer party and a sharee party and share the target mail with the sharee party according to the mail sharing request, to enable the sharer party and the sharee party to perform, based on the target mail, information interaction in the sharing group.

A non-transitory computer-readable storage medium is further provided. The computer-readable storage medium stores a computer program, where the computer program, when executed by a processing apparatus, implements receiving a mail sharing request sent by a sharer party based on a target mail; and creating a sharing group comprising the sharer party and a sharee party and sharing the target mail with the sharee party according to the mail sharing request, to enable the sharer party and the sharee party to perform, based on the target mail, information interaction in the sharing group.

BRIEF DESCRIPTION OF DRAWINGS

FIG. 2B is a schematic diagram of a display interface of a discussion group according to embodiment two of the present disclosure;

FIG. 2D is a schematic diagram of a display interface of a discussion group in a hidden state according to embodiment two of the present disclosure;

DETAILED DESCRIPTION

Figure 1A:
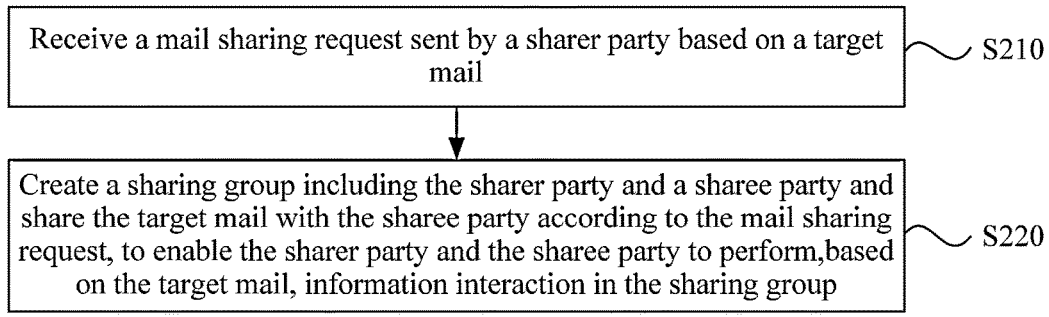
FIG. 1A is a flowchart of an information interaction method according to embodiment one of the present disclosure.

Embodiments of the present disclosure will be described below with reference to the drawings. Although some embodiments of the present disclosure are shown in the drawings, the present disclosure may be implemented in multiple forms and should not be construed as limited to the embodiments set forth herein; conversely, these embodiments are provided to understand the present disclosure.

Multiple steps recited in the method implementations of the present disclosure may be executed in a different order, and/or in parallel. In addition, the method implementations may include additional steps and/or omit performing the illustrated steps. The scope of the present disclosure is not limited in this respect.

As used herein, the term "comprise" and variations thereof are intended to be inclusive, that is, "comprises, but is not limited to". The term "based on" is "at least partially based on". The term "one embodiment" means "at least one embodiment"; the term "another embodiment" means "at least one another embodiment"; the term "some embodiments" means "at least some embodiments". Related definitions of other terms will be given in the description below.

References to "first", "second" and the like in the present disclosure are merely intended to distinguish one from another apparatus, module, or unit and are not intended to limit the order or interrelationship of functions executed by the apparatus, module, or unit.

References to modifications of "one" or "multiple" in the present disclosure are intended to be illustrative and not limiting and should be understood as "one or more" unless the context clearly indicates otherwise.

The names of messages or information exchanged between multiple apparatuses in the embodiments of the present disclosure are only for illustrative purposes and are not intended to limit the scope of such messages or information.

When a sharer needs to conduct multi-party discussion and communication based on a mail, in an implementation, the sharer first forwards the mail to each sharee party, and then communicates with multiple sharee parties one by one or holds an offline face-to-face meeting for discussion, which causes the low inefficient in multi-party collaborative communication. In view of this, in some implementations of the present disclosure, a mail sharing request sent by a sharer party based on a target mail is received, and a sharing group including the sharer party and a sharee party is created and the target mail is shared with the sharee party according to the mail sharing request. In this manner, information interaction between the sharer party and the sharee party in the sharing group based on the target mail can be achieved, and the information interaction efficiency of multi-party collaborative communication is improved.

Embodiment One

FIG. 1A is a flowchart of an information interaction method according to embodiment one of the present disclosure. The method may be applied to the case of information interaction between a sharer and a sharee, and the method may be executed by an electronic device such as a computer and a server. The method includes the steps described below.

In S110, a mail sharing request sent by a sharer party based on a target mail is received.

In the embodiment, the target mail may be a mail that the sharer party needs to share with the sharee party. The target mail may come from a mail terminal, or may come from an IM terminal. The sharer party may be a client used by a sharer of the target email, and the sharee party may be a client used by a sharee of the target email. Exemplarily, the case where the target mail comes from the mail terminal may include, for example, that the sharer party shares, based on a newly-created draft or a received email, the newly-created draft or the received mail. The case where the target mail comes from the IM terminal may include, for example, that the sharer party re-shares a mail that has been shared with the IM terminal.

When sending the mail sharing request, the sharer party may specify one sharee party or may specify multiple sharee parties, that is, the sharer party may share the target mail with one sharee party or may share the target mail with multiple sharee parties, which is not limited here.

In an embodiment, the target mail includes at least one mail draft or multiple associated mails having the same feature information. The target mail involved in the embodiment may be one or more mail drafts or multiple associated mails having the same feature information. The mail draft may be a new draft created separately by the sharer party, and the associated mails having the same feature information may be a mail set composed of multiple mails having at least one of the following pieces of feature information: the same subject, a sending time being within a preset time range, the same sender, the same recipient, a reply reference relationship or a forwarding reference relationship.

The sharer may initiate the mail sharing request for the target mail on the mail client used by the sharer to share the target mail. The client used by the sharer may include a computer client or a mobile phone client. The manner in which the sharer party initiates the mail sharing request includes, but is not limited to, that the sharer clicks on a button representing a sharing function in a display interface of the target mail, thereby triggering the generation of the mail sharing request for the target mail.

Figure 1B:
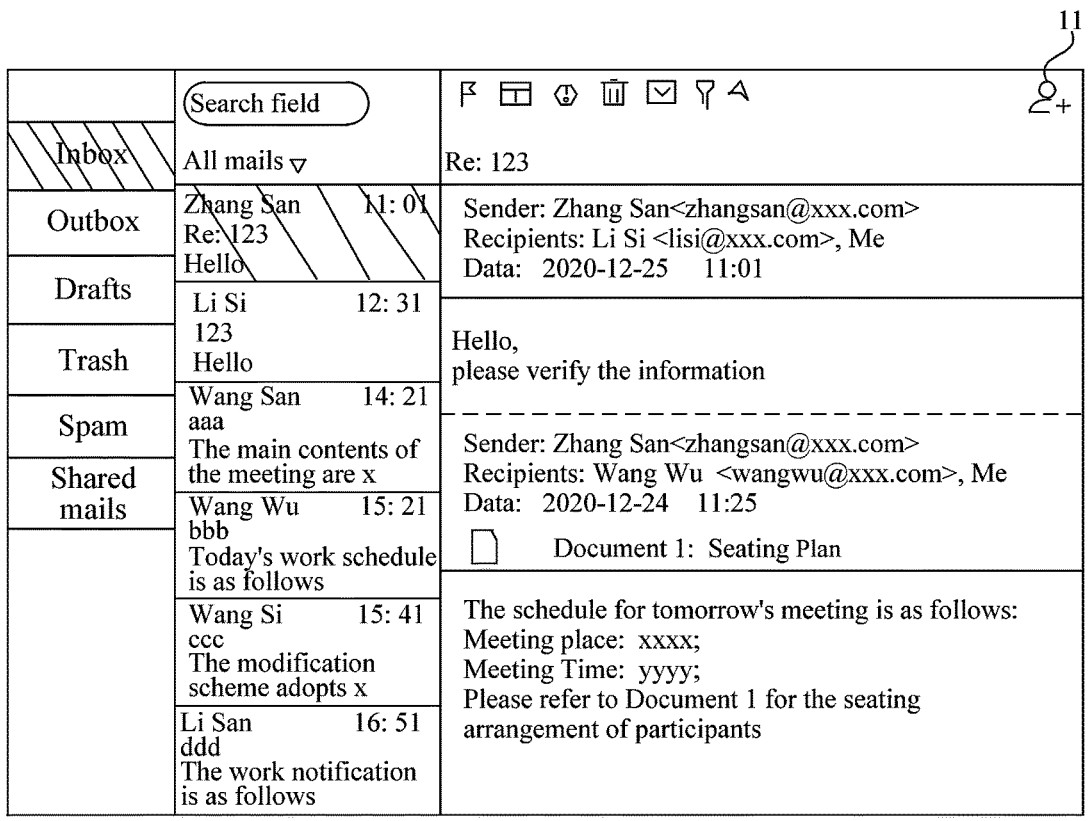
FIG. 1B is a schematic diagram of a display interface of a mail client according to embodiment one of the present disclosure.

Exemplarily, on the interface of the mail client shown in FIG. 1B, if the to-be-shared target mail is the mail replied by Zhang San in the inbox in the figure, the sharer may initiate the sharing of the target mail by clicking on the sharing button 11 displayed in the upper right corner of the mail content displaying window under the mail and become the sharer party of the target mail, and at the same time, the mail sharing request is generated. At this time, the server may receive the mail sharing request sent by the sharer party based on the mail replied by Zhang San. In an example, after the sharer triggers the sharing button on the client of the sharer, a displaying window of candidate sharee parties may pop up, and identity information such as avatars of multiple candidate sharee parties is displayed in the displaying window. The sharer may select the avatar of the sharee party needing mail sharing from the displaying window and click on a confirmation button to trigger the generation of the mail sharing request on the client, and the mail sharing request is sent to the server, so that the server creates a sharing group including the sharer party and the selected sharee party according to the mail sharing request.

In S120, the sharing group including the sharer party and the sharee party is created and the target mail is shared with the sharee party according to the mail sharing request, to enable the sharer party and the sharee party to perform, based on the target mail, information interaction in the sharing group.

In the embodiment, after receiving the mail sharing request sent by the sharer party, the server may create a sharing group including the sharer party and at least one sharee party based on the target mail, that is, create a sharing group associated with the target mail, and add the sharer party and the sharee party into the sharing group as group members of the sharing group. The manner of sharing the target mail with the sharee party includes, but is not limited to, displaying the target mail in association based on the created sharing group, so that the sharer party and the sharee party can perform information interaction in the sharing group based on the target mail. After the sharing group is created, the sharer party and the sharee party which are members of the sharing group may perform online multi-party collaborative information interaction in the sharing group based on the displayed target mail. The information interaction manner includes, but is not limited to, text interaction, voice interaction, video interaction, collaborative editing and the like.

In the embodiment, the mail sharing refers to that the sharer party shares the target mail with the sharee party in the manner of creating a group, so that the sharee party can view and/or edit the target mail. However, the sharee party actually cannot really own the target mail, that is, the target mail obtained by the sharee party by sharing will be automatically deleted as the sharing ends.

In an embodiment, the mail sharing request includes: a sharer party identifier and a sharee party identifier.

The step in which the sharing group including the sharer party and the sharee party is created includes the following steps: according to the sharer party identifier and the sharee party identifier, the sharing group including the sharer party and the sharee party is created, and a corresponding group identifier is allocated to the sharing group; and the group identifier is sent to the sharer party and the sharee party to enable the sharer party and the sharee party to acquire a group message of the sharing group in real time according to the group identifier.

Exemplarily, the mail sharing request sent by the sharer party may include the sharer party identifier and the sharee party identifier. The sharer party identifier and the sharee party identifier may be unique information identifying the identity of the sharer party and the sharee party, such as an account number. The server, when creating the sharing group, may add the sharer party and the sharee party into the sharing group by using the sharer party identifier and the sharee party identifier of at least one sharee party specified by the sharer party.

Different groups correspond to different group identifiers, such as group numbers. The sharing group is also correspondingly allocated with a group identifier after being created. The server may send the group identifier of the sharing group to the sharer party and the sharee party, so that the sharer party and the sharee party may pull a group message of the sharing group associated with the group identifier in real time from the server.

In an embodiment, after the group identifier is sent to the sharer party and the sharee party, the method further includes the following step: the sharing group is started in the sharer party and the sharee party respectively according to the group identifier.

In an embodiment, after the group identifier is sent to the sharer party and the sharee party, the method further includes the following steps: the sharing group is started in the sharer party according to the group identifier; and a sharing group creation prompt is displayed on the sharee party, where the sharing group creation prompt is used for prompting the sharee party that a new sharing group is created; and the sharing group is started in the sharee party after a viewing operation instruction of the sharee party is received.

In the embodiment, the sharing group being started may be that the sharing group is opened and a group message in the sharing group is acquired and displayed in time. The following two manners may be used for starting the sharing group in the sharee party: in one manner, no group creation prompt is displayed, and the sharing group is directly started in the sharee party; in the other manner, a sharing group creation prompt is displayed to prompt the sharee that a new sharing group is created, and the sharing group is started in the sharee party if a viewing operation instruction generated by the sharee party when the sharee views the sharing group for the first time is received. Since the sharer party is the group creator initiating the sharing, the sharing group can be directly started according to the group identifier.

In an embodiment, after the target mail is shared with the sharee party, the method further includes the following step: the target mail is displayed to the sharer party and/or the sharee party.

Exemplarily, the target mail may be displayed to the sharer party and/or the sharee party based on the created sharing group. An association relationship between the target mail and the sharing group may be established, and according to the association relationship, the target mail is displayed to the sharer party and/or the sharee party in the sharing group or based on a display position of the sharing group.

In an embodiment, the step in which the target mail is displayed includes the following steps: mail information of the target mail is displayed in a form of a mail card in the sharing group; and/or, a mail content displaying window is constructed, and a mail content of the target mail is expanded and displayed in the mail content displaying window.

In the embodiment, the mail information of the target mail may be displayed in the mail card, and the mail card may also be a displaying form for opening the link for displaying the mail content displaying window. The mail information of the target mail may include at least one of a mail name, sender information, recipient information or partial information of the mail content.

Exemplarily, the sharer or the sharee may open the mail content displaying window by clicking on the mail card, and the mail content of the target mail is expanded and displayed in the mail content displaying window. A mail content displaying button may further be separately set, and the button is clicked on to open the mail content displaying window. The opening manner is not limited here.

Figure 1C:
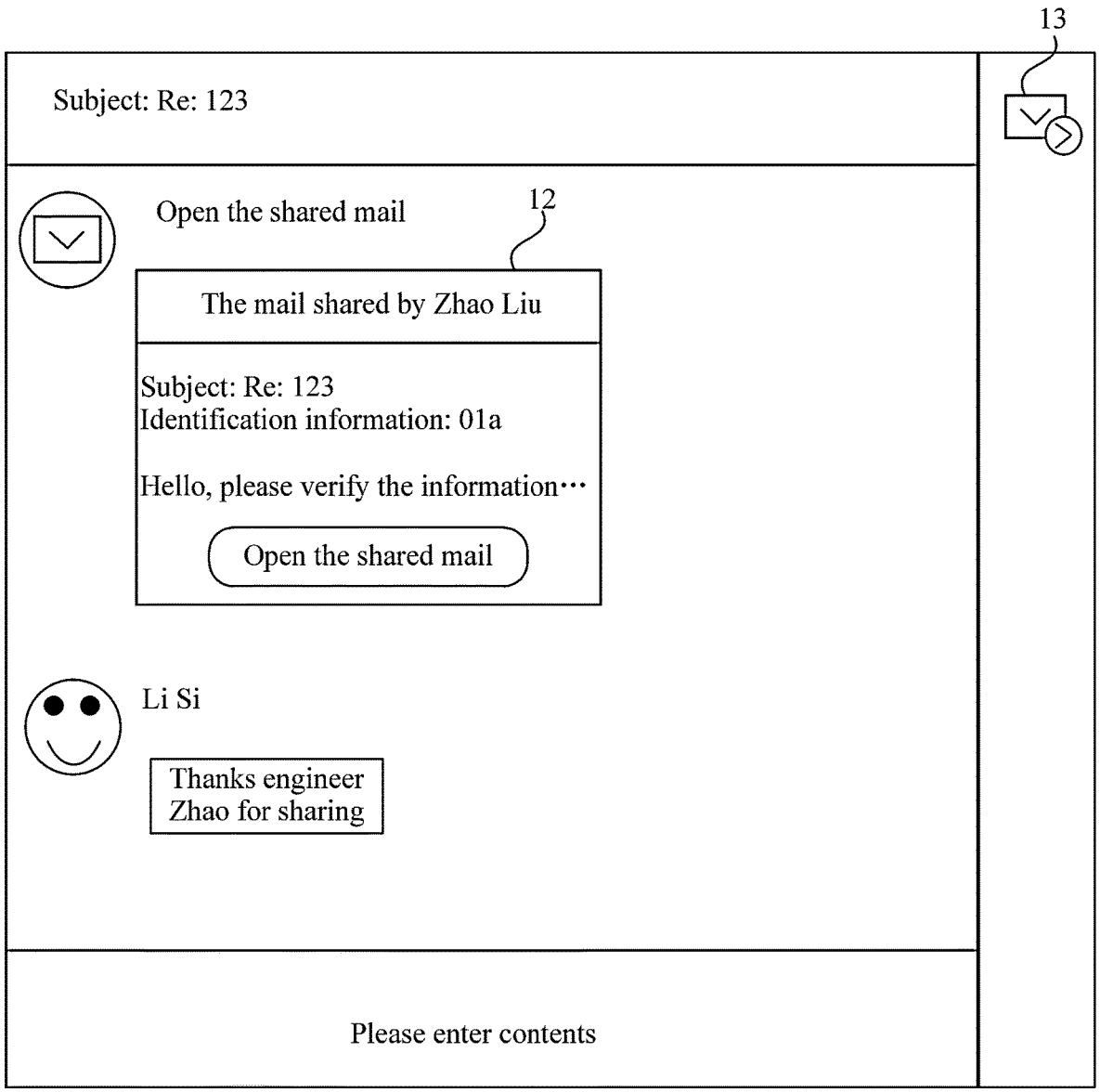
FIG. 1C is a schematic diagram of a group display interface according to embodiment one of the present disclosure.

In an example, the mail information of the target mail may be displayed in the form of the mail card 12 in the sharing group shown in FIG. 1C. The mail content displaying window may also be separately constructed, and the mail content of the target mail is expanded and displayed in the mail content displaying window. A user may click on the mail card 12, or a mail content displaying button 13 may be separately set on a side status bar of the sharing group, so that the mail content displaying window pops up for displaying.

In an embodiment, after the target mail is shared with the sharee party, the method further includes the following steps: a mail re-sharing request sent by the sharer party or the sharee party is received; and the target mail is shared with a newly-added sharee party indicated by the mail re-sharing request according to the mail re-sharing request.

Exemplarily, after the first sharing of the target mail, the second sharing may also be performed. The sharer party or the sharee party may initiate the second sharing based on the shared target mail, and the server may share the target mail with the newly-added sharee party after receiving the mail re-sharing request of the sharer party or the sharee party based on the target mail. The manner of initiating the second sharing includes, but is not limited to, inviting the newly-added sharee party to join the sharing group.

In an embodiment, after the target mail is shared with the newly-added sharee party indicated by the mail re-sharing request, the method further includes the following step: the newly-added sharee party is added to the sharing group.

According to the technical schemes of the embodiment, the mail sharing request sent by the sharer party based on the target mail is received, and the sharing group including the sharer party and the sharee party is created and the target mail is shared with the sharee party according to the mail sharing request, to enable the sharer party and the sharee party to perform, based on the target mail, information interaction in the sharing group. Communication is conducted in the group created based on the shared mail, so that the problem is solved that in the related art, the mail is first forwarded to each sharee party, and then communication is conducted with multiple sharee parties one by one or an offline face-to-face meeting is held for discussion, leading to low information interaction efficiency. Therefore, the information interaction efficiency of multi-party collaborative communication is improved.

Based on multiple optional schemes in the preceding embodiment, in an embodiment, the sharing group includes a discussion group at the mail terminal and/or an IM group at the IM terminal.

In an embodiment, the step in which the sharing group including the sharer party and the sharee party is created includes the following steps: a discussion group including the sharer party and the sharee party is created at the mail terminal of the sharer party and the mail terminal of the sharee party; and/or an IM group including the sharer party and the sharee party is created at the IM terminal of the sharer party and the IM terminal of the sharee party.

Exemplarily, the sharing group may be set at the mail terminal of the sharer party and the mail terminal of the sharee party, that is, a discussion group is created at the mail terminal of the sharer party and the mail terminal of the sharee party through the server, and the discussion group is displayed at the mail terminal of the sharer party and the mail terminal of the sharee party; the sharing group may also be set at the IM terminal of the sharer party and the IM terminal of the sharee party, that is, an IM group is created at the IM terminal of the sharer party and the IM terminal of the sharee party through the server, and the IM group is displayed at the IM terminal of the sharer party and the IM terminal of the sharee party, which is not limited here.

Embodiment Two

In the related art, when group management is performed, only a group management manner of an ordinary group that is not related to a mail exists, and no group management manner of a group that has a strong association relationship with a mail exists. An ordinary group may be a group constructed by operating in a mail-independent manner, and a group having a strong association relationship with a mail may include a special group constructed based on a mail operation. In addition, since the management of the special group constructed based on the mail operation is different from the management of the ordinary group, the embodiment aims to achieve the special group management for the special group constructed based on the mail operation. The special group constructed based on the mail operation may be, for example, the sharing group involved in the embodiment.

Figure 2A:
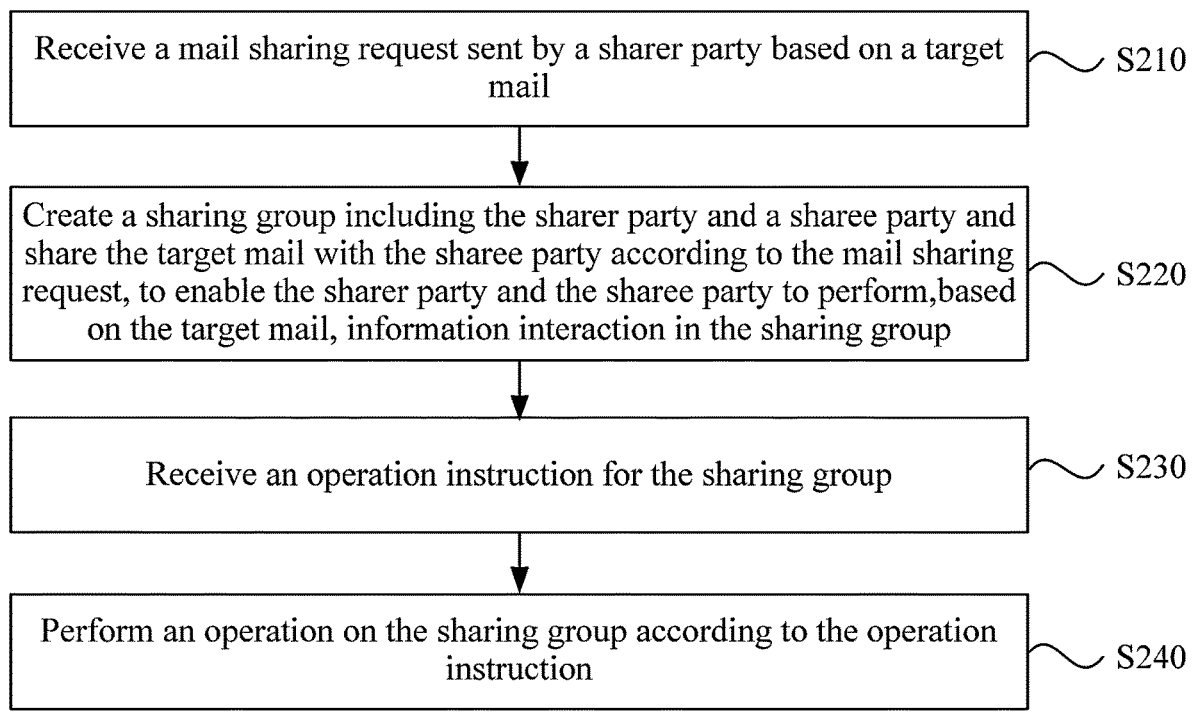
FIG. 2A is a flowchart of an information interaction method according to embodiment two of the present disclosure.

FIG. 2A is a flowchart of an information interaction method according to embodiment two of the present disclosure. The embodiment is described based on multiple optional schemes in the preceding embodiment and provides an optional information interaction method, and the following steps are further included: an operation instruction for a sharing group is received; and an operation is performed on the sharing group according to the operation instruction. The steps described below are included.

In S210, a mail sharing request sent by a sharer party based on a target mail is received.

In S220, a sharing group including the sharer party and a sharee party is created and the target mail is shared with the sharee party according to the mail sharing request, to enable the sharer party and the sharee party to perform, based on the target mail, information interaction in the sharing group.

In S230, an operation instruction for the sharing group is received.

In the embodiment, the sharing group may be a group having a strong association relationship with the target mail, such as a sharing group created by performing a sharing operation based on the target mail. In an embodiment, the sharing group may include, for example, a discussion group at a mail terminal and/or an IM group at an IM terminal. The sharing group may be set at the mail terminal, for example, a discussion group is created through a mail terminal server and is displayed on a mail client; the sharing group may also be set at the IM terminal, that is, an IM group is created through an IM terminal server and is displayed on an IM client, which is not limited here. Exemplarily, when a discussion group at the mail terminal and an IM group at the IM terminal exist simultaneously, synchronous display may be performed, so that the group message presented in the discussion group is the same as the group message presented in the IM group.

The operation instruction for the sharing group in the embodiment may be an operation instruction generated by an administrator of the sharing group, such as the sharer of the target mail, triggering a group management operation on the sharing group on a client used by the administrator. The operation of performing group management on the sharing group includes, but is not limited to: group creation, group disbanding, group attribute setting, group function implementation, authority allocation during the group creation, authority revoking during the group disbanding and authority transfer when a group owner leaves the group.

Exemplarily, after generating the operation instruction for the sharing group, the client may send the operation instruction to the server, and the server performs a corresponding group management operation according to the received operation instruction for the sharing group.

Figure 2B:
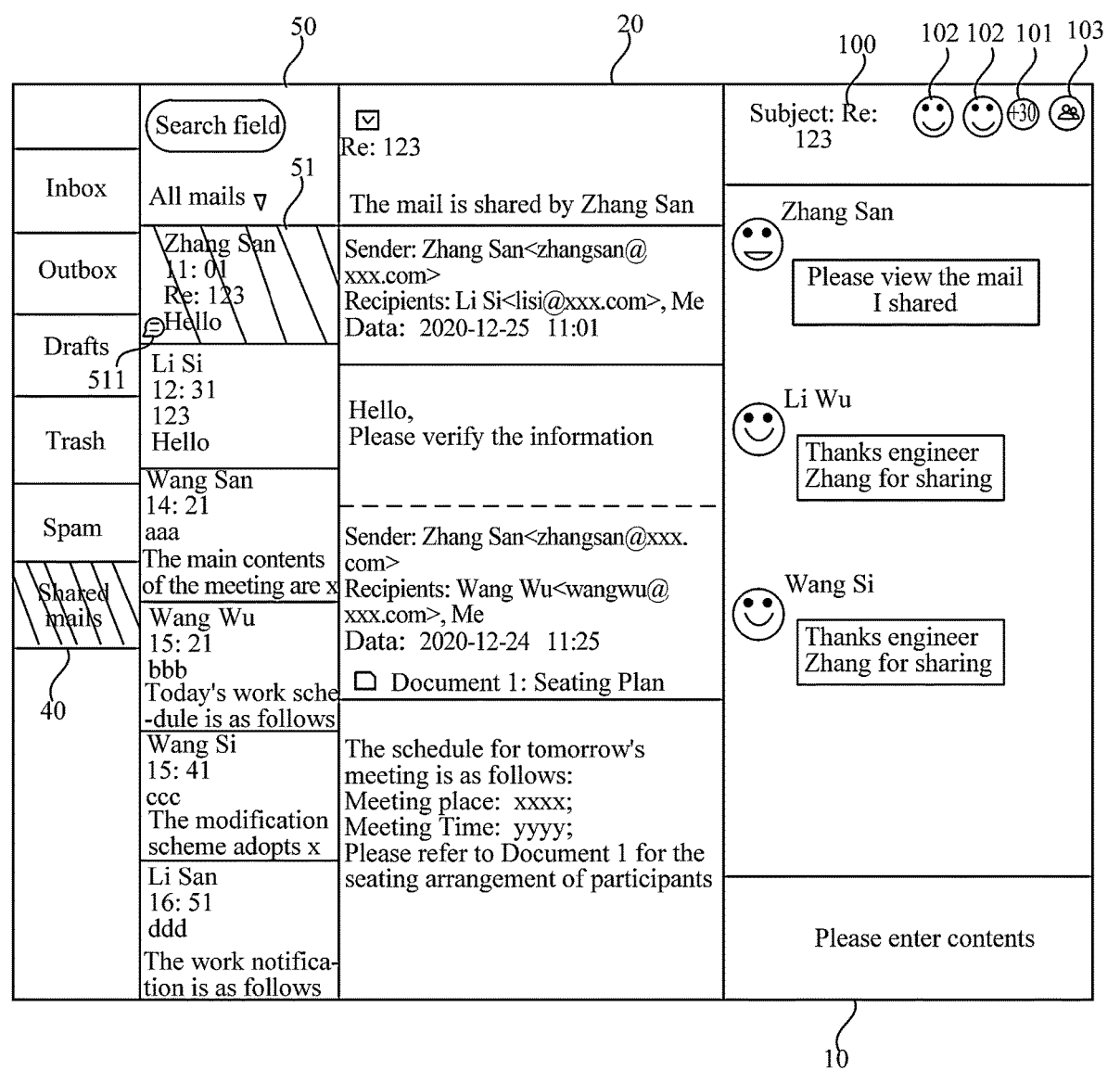

In the embodiment, when the sharing group is a discussion group at the mail terminal, some special display may be performed on the discussion group. For example, a schematic diagram of a display interface of a discussion group displayed on a mail client is shown in FIG. 2B. The discussion group 10 is displayed on a side of the mail content displaying window 20, so that a user can view the mail content of the target mail while discussing in the discussion group, and thus the interaction efficiency is improved based on the mail content.

In an embodiment, the discussion group at the mail terminal may display a status bar for displaying group member information.

The displaying of the status bar enables the user to know some information of group members, which facilitates the management of the group members.

In an embodiment, the group member information may include at least one of the following: the number of group members, a group member avatar or a group member adding identifier.

Exemplarily, the number of group members may be the number of group members included in the discussion group. The group member avatar may be an image identifier of a group member in the discussion group. The group member adding identifier may be an entry for a group administrator to add a new member to the discussion group. The group administrator may click on the group member adding identifier to trigger the popping up of a display window of candidate members, and select the to-be-added new member in the window to complete the operation of inviting a new member to join the group.

For example, on the display interface of the discussion group shown in FIG. 2B, the discussion group 10 displays a status bar 100 for displaying group member information. The number of group members 101, the group member avatars 102 and the group member adding identifier 103 are displayed.

When the discussion group is an IM group at the IM terminal, some special display may also be performed on the IM group. In an embodiment, the IM group at the IM terminal displays a group name associated with the target mail. The group name associated with the target mail includes, but is not limited to, using the mail subject of the target mail as the group name of the IM group for displaying. In this way, it is convenient for the user to find the IM group strongly associated with the target mail from multiple groups on the IM client, and it is also convenient for the user to distinguish the IM group from IM groups associated with other mails or ordinary groups.

Figure 2C:
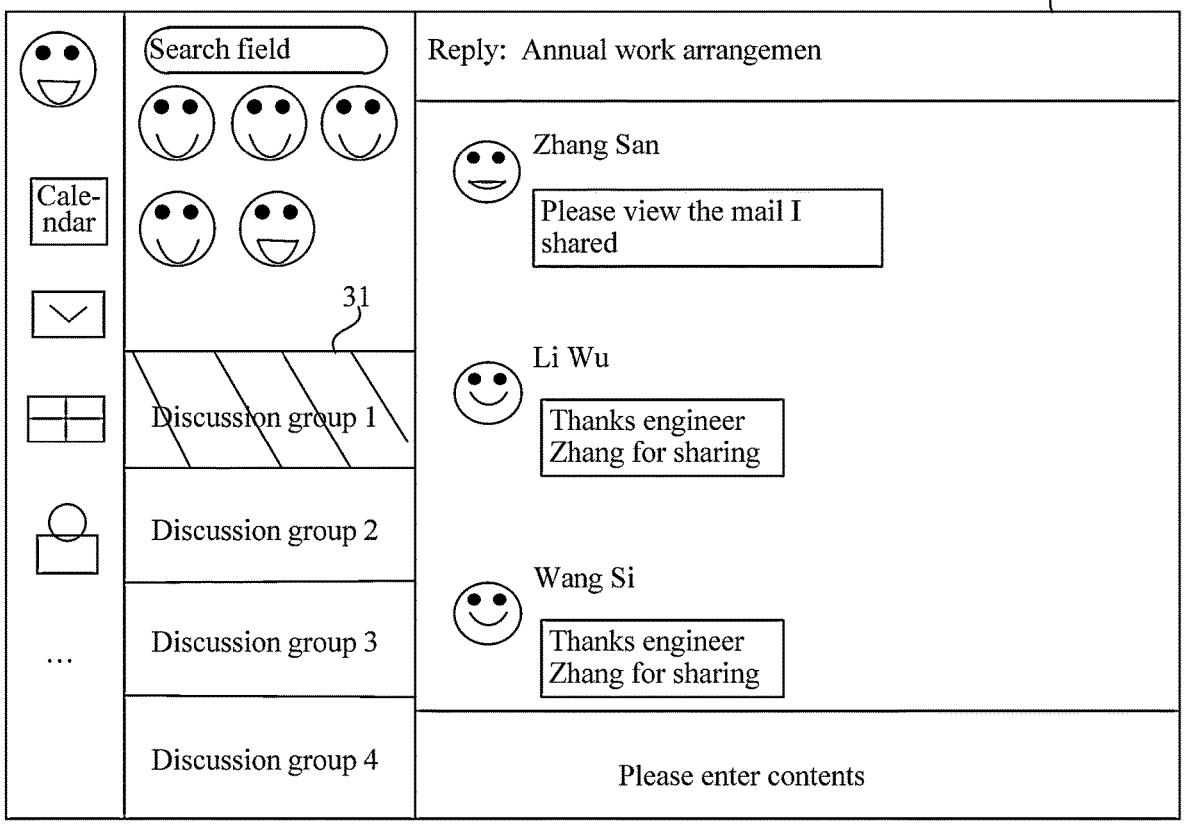
FIG. 2C is a schematic diagram of a display interface of an IM group according to embodiment two of the present disclosure.

For example, a schematic diagram of a display interface of an IM group displayed on an IM client is shown in FIG. 2C. The group name of the IM group 30 is the mail subject of the target mail associated with the IM group 30, that is, the mail subject of the target mail is "Reply: Annual work arrangement", and the group name displayed above the display interface of the IM group 30 is "Reply: Annual work arrangement".

In S240, an operation is performed on the sharing group according to the operation instruction.

In the embodiment, after receiving the operation instruction for the sharing group, the server may perform a corresponding group management operation according to the operation instruction. In an example, when receiving a new member adding instruction for the sharing group, the server may add a specified new member to the sharing group based on the new member adding instruction. The management operation of the sharing group is not limited to adding a new member, and the above is merely illustrative here. Other management operations of the sharing group may also be included and are not limited here.

For a group strongly associated with the target mail, such as the sharing group constructed based on the sharing operation of the target mail, some special management operations need to be performed, and the details are described below.

In an embodiment, the step in which the operation instruction for the sharing group is received includes that a group joining verification starting instruction sent by the sharer party for the TM group is received. Correspondingly, the step in which the operation is performed on the sharing group according to the operation instruction includes that a group verification interface is provide in the IM group displayed in the sharer party, to enable the sharer party to process a group verification message at the IM terminal.

In the embodiment, the sharer party may be the client used by the sharer of the target email, and correspondingly, the sharee party may be the client used by the sharee of the target email.

Exemplarily, in the IM group constructed by the sharer party sharing the target mail with the sharee, the sharer party is the group owner of the IM group by default, and the sharee party is a group member of the IM group. The sharer party may start group joining verification for the IM group, so that group members cannot add a new member into the group by the group members themselves, and a new member cannot join the group at will and can join the IM group only after verification by the sharer party. The sharer may set and start a group verification function on the client, for example, select the option of the group verification function, thereby triggering the generation of a group joining verification starting instruction, and sending the group joining verification starting instruction to the server. After receiving the group joining verification starting instruction, the server may start the corresponding group verification function in the IM group displayed in the sharer party according to the instruction, that is, provide a group verification interface. When a new member tries to join the group, prompt information is displayed in the sharer party so that the sharer performs group verification processing on the group joining of the new member.

The group verification function is convenient for the management of the group by the sharer party, and thus the security of the group information and the target mail is improved.

In an embodiment, the step in which the operation instruction for the sharing group is received includes that a group silence instruction sent for the discussion group is received.

Correspondingly, the step in which the operation is performed on the sharing group according to the operation instruction includes that a new message reminding manner of the discussion group is switched from a first reminding manner to a second reminding manner. The first reminding manner includes at least one of the following: sound reminding, displaying a first reminding identifier based on a group icon of the discussion group or displaying a second reminding identifier based on the mail information of the target mail; and the second reminding manner includes displaying a third reminding identifier based on the group icon of the discussion group.

In an embodiment, the third reminding identifier includes a target reminding identifier selected from at least two selectable identifiers corresponding to the discussion group.

Exemplarily, in the embodiment, based on the discussion group constructed at the mail terminal by the sharer party sharing the target mail with the sharee, a group silence function is provided. The sharer or the sharee may perform silence setting on the mail client used by the sharer or the sharee according to requirements. The sharer or the sharee may select the option of the group silence function on the mail client used by the sharer or the sharee to trigger the generation of a group silence instruction, and send the group silence instruction to the server. After receiving the group silence instruction, the server may start a silent mode in the discussion group displayed in the sharer party according to the instruction, that is, the server may switch the new message reminding manner of the discussion group from the first reminding manner in a non-silent mode to the second reminding manner in the silent mode.

The first reminding manner includes, but is not limited to, sound reminding, displaying a first reminding identifier based on a group icon of the discussion group and displaying a second reminding identifier based on the mail information of the target mail. The second reminding manner includes, but is not limited to, displaying a third reminding identifier based on the group icon of the discussion group. The first reminding identifier and the second reminding identifier are more conspicuous than the third reminding identifier. The conspicuousness may be embodied in a brighter color, a more specific information prompt content, etc. For example, the first reminding identifier may be a red number corresponding to the number of new messages, and the second reminding identifier may be a red icon. Correspondingly, the third reminding identifier may be, for example, a grey number or a red dot corresponding to the number of new messages, and may be selected according to the setting of the user.

Figure 2D:
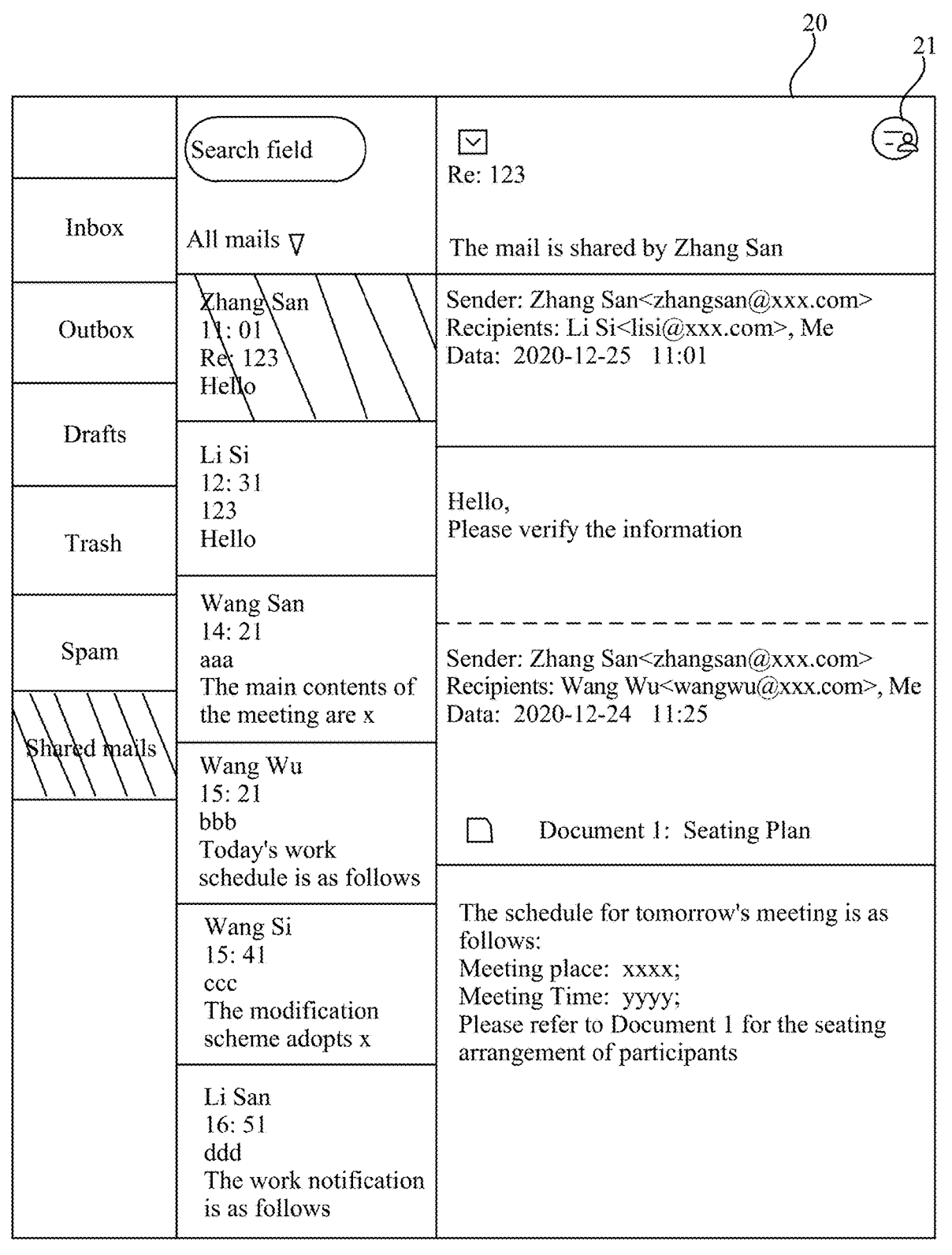

In an example, as shown in FIG. 2B, when the user clicks on the mail sharing tab 40, the corresponding mail list 50 may be displayed, and mails displayed in the mail list 50 are all shared mails. The mail shared by Zhang San in FIG. 2B is taken as an example. Taking the mail shared by Zhang San as an example, the mail shared by Zhang San is used as a target mail, and mail information 51 of the target mail is displayed in the mail list 50. When the discussion group is in the non-silent mode, a red discussion icon 511 is displayed in the lower left corner of the mail information 51 if a new message is received; when the discussion group is in the silent mode, the red discussion icon 511 is not displayed if a new message is received. For another example, as shown in FIG. 2D, when the discussion group is in a hidden state, the group icon 21 for the discussion group popping up may be displayed on the mail content displaying window 20. When the discussion group is in the non-silent mode, a red number is displayed on the group icon 21 if a new message is received. When the discussion group is in the silent mode, a grey number or a red dot is displayed on the group icon 21 if a new message is received.

In an embodiment, the step in which the operation instruction for the sharing group is received includes that a group silence instruction sent for the IM group is received. Correspondingly, the step in which the operation is performed on the sharing group according to the operation instruction includes that a new message reminding manner of the IM group is switched from a third reminding manner to a fourth reminding manner. The third reminding manner includes sound reminding and/or displaying a fourth reminding identifier based on a message stream corresponding to the IM group; and the fourth reminding manner includes displaying a fifth reminding identifier based on the message stream corresponding to the IM group.

In an embodiment, the fifth reminding identifier includes a target reminding identifier selected from at least two selectable identifiers corresponding to the IM group.

Exemplarily, in the embodiment, based on the IM group constructed at the IM terminal by the sharer party sharing the target mail with the sharee, a group silence function is provided. The sharer or the sharee may perform silence setting on the IM client used by the sharer or the sharee according to requirements. The sharer or the sharee may select the option of the group silence function on the IM client used by the sharer or the sharee to trigger the generation of a group silence instruction, and send the group silence instruction to the server. After receiving the group silence instruction, the server may start a silent mode in the IM group displayed in the sharer party according to the instruction, that is, the new message reminding manner of the IM group is switched from the third reminding manner in a non-silent mode to the fourth reminding manner in the silent mode.

The third reminding manner includes, but is not limited to, sound reminding and displaying a fourth reminding identifier based on a message stream corresponding to the IM group; and the fourth reminding manner includes, but is not limited to, displaying a fifth reminding identifier based on the message stream corresponding to the IM group. The fourth reminding identifier is more conspicuous than the fifth reminding identifier. The conspicuousness may be embodied in a brighter color, a more specific information prompt content, etc. For example, the fourth reminding identifier may be a red number corresponding to the number of new messages. Correspondingly, the fifth reminding identifier may be, for example, a grey number or a red dot corresponding to the number of new messages, and may be selected according to the setting of the user.

In an example, as shown in FIG. 2C, when the IM group 30 is in the non-silent mode, a red number corresponding to the number of new messages is displayed in the message stream 31 corresponding to the IM group 30 if new messages are received. When the IM group is in the silent mode, a grey number corresponding to the number of new messages or only a red dot is displayed in the message stream 31 corresponding to the IM group 30 if new messages are received.

Different new message reminding manners are used when the group is in different states, so that the user can change the display and reminding manner of the sharing group according to requirements, and thus personalized selection requirements of the user are satisfied and the interactivity is increased.

According to the technical schemes of the embodiment, the operation instruction for the sharing group is received, where the sharing group is a group for performing information interaction based on the target mail, and the operation is performed on the sharing group according to the operation instruction. Management operation is performed on the sharing group for information interaction based on the target mail, so that the problem is solved that in the related art, only the management operation of the ordinary group exists while no management operation of the special group constructed based on the mail operation exists, and thus the group management of the special group constructed based on the mail operation is achieved.

Embodiment Three

Figure 3:
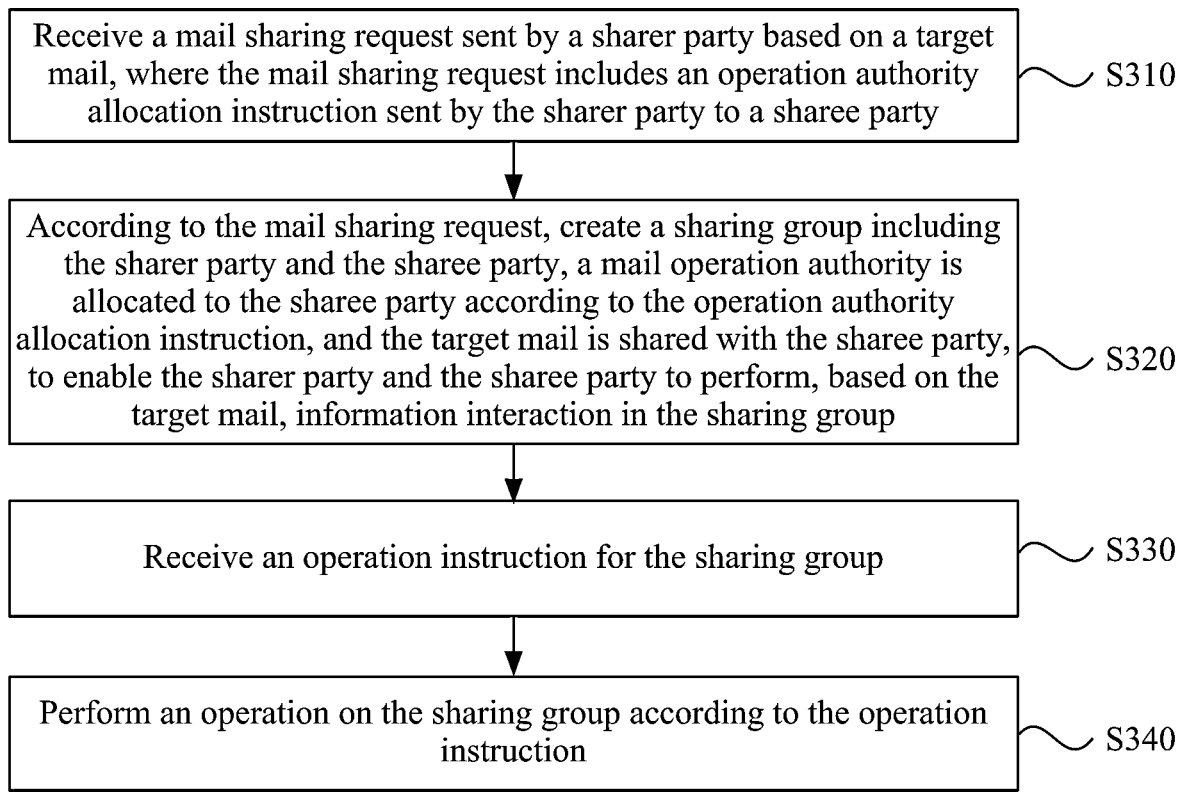
FIG. 3 is a flowchart of an information interaction method according to embodiment three of the present disclosure.

FIG. 3 is a flowchart of an information interaction method according to embodiment three of the present disclosure. The embodiment is described based on multiple optional schemes in the preceding embodiments and provides an optional information interaction method. In this information interaction method, the mail sharing request includes an operation authority allocation instruction sent by the sharer party to the sharee party. After the mail sharing request sent by the sharer party based on the target mail is received, the method further includes that a mail operation authority is allocated to the sharee party according to the operation authority allocation instruction. The steps described below are included.

In S310, a mail sharing request sent by a sharer party based on a target mail is received, where the mail sharing request includes an operation authority allocation instruction sent by the sharer party to a sharee party.

In S320, a sharing group including the sharer party and the sharee party is created according to the mail sharing request, a mail operation authority is allocated to the sharee party according to the operation authority allocation instruction, and the target mail is shared with the sharee party, to enable the sharer party and the sharee party to perform, based on the target mail, information interaction in the sharing group.

Based on the preceding embodiments, in the embodiment, when the sharing group is created based on the shared target mail, a mail operation authority may further be allocated to the sharee party. The mail operation allocation authority may be an operation authority for the target mail allocated by the sharer party to the sharee party. The mail sharing request sent by the sharer party may include the operation authority allocation instruction sent by the sharer party to the sharee party. After receiving the operation authority allocation instruction, the server may, while creating the sharing group, allocate the mail operation authority to the sharee party according to the operation authority allocation instruction.

The mail operation authority is set, so that each sharee party may be allocated an authority that may be owned by the each sharee party according to requirements of the sharer party, the sharee party can perform an operation on the target mail within the range of the authority owned by the sharee party, and thus the collaborative management of the target mail is facilitated.

In an embodiment, the mail operation authority includes at least one of editing authority, reading authority or sharing authority.

The editing authority may be the authority to edit the content of the target mail, for example, the authority of writing, modifying, commenting and the like on the content of the mail. The reading authority may be the authority to read and view the content of the target mail, for example, the authority of opening the target mail, viewing the content of the mail, etc. The sharing authority may be the authority to perform the second sharing of the target mail, for example, the authority of sharing the target mail with other users, inviting other users to join a group, etc.

In S330, an operation instruction for the sharing group is received.

In S340, an operation is performed on the sharing group according to the operation instruction.

In an embodiment, the steps in which the operation instruction for the sharing group is received, and the operation is performed on the sharing group according to the operation instruction include the following steps: a group operation instruction sent by the sharer party or the sharee party is received, and the mail operation authority of the sharee party is revoked or partially revoked according to the group operation instruction.

In the embodiment, after the sharer party shares the target mail, the sharing of the target mail may be revoked or partially revoked according to the group operation instruction sent by the sharer party or the sharee party, that is, the mail operation authority allocated by the sharer party to all sharee parties is withdrawn, or the mail operation authority allocated by the sharer party to part of sharee parties is withdrawn. The group operation instruction includes, but is not limited to, instructions of group leaving, group disbanding and sharing revoking.

In the embodiment, when the management is performed on the sharing group created based on the target mail shared by the sharer party, the management of the mail operation authority may be performed from aspects described below.

The sharee party whose mail operation authority is revoked no longer has the operation authority of the target mail. For example, the sharee party cannot perform operations such as editing, reading and sharing on the target mail, so that the sharing of the target mail is revoked or partially revoked.

In an embodiment, the step in which the group operation instruction sent by the sharer party or the sharee party is received, and the mail operation authority of the sharee party is revoked or partially revoked according to the group operation instruction includes the following steps: a mail sharing revoking instruction sent by the sharer party is received; and the mail operation authority of the sharee party is revoked according to the mail sharing revoking instruction.

In an embodiment, the step in which the group operation instruction sent by the sharer party or the sharee party is received, and the mail operation authority of the sharee party is revoked or partially revoked according to the group operation instruction includes the following steps: a first group leaving operation instruction sent by the sharer party is received; and the sharer party is removed from the sharing group according to the first group leaving operation instruction, and the mail operation authority of the sharee party in the sharing group is revoked.

In an embodiment, after the first group leaving operation instruction sent by the sharer party is received, the method further includes the following step: ownership of the sharer party and a group operation authority of the sharer party are transferred to a target group member in the sharing group according to an ownership transfer instruction sent by the sharer party or a preset transfer rule.

In an embodiment, the step in which the group operation instruction sent by the sharer party or the sharee party is received, and the mail operation authority of the sharee party is revoked or partially revoked according to the group operation instruction includes the following steps: a group disbanding operation instruction sent by the sharer party is received; and the sharing group is disbanded according to the group disbanding operation instruction, and the mail operation authority of the sharee party in the sharing group is revoked.

In an embodiment, the step in which the group operation instruction sent by the sharer party or the sharee party is received, and the mail operation authority of the sharee party is revoked or partially revoked according to the group operation instruction includes the following steps: a second group leaving operation instruction sent by a target sharee party is received; and the target sharee party is removed from the sharing group according to the second group leaving operation instruction, and mail operation authority of the target sharee party is revoked.

In an embodiment, the step in which the group operation instruction sent by the sharer party or the sharee party is received, and the mail operation authority of the sharee party is revoked or partially revoked according to the group operation instruction the following steps: an ownership transfer instruction sent by the sharer party is received; and ownership of the sharer party and a group operation authority of the sharer party are transferred to a target group member in the sharing group according to the ownership transfer instruction, and the mail operation authority of the sharee party in the sharing group is revoked.

In the embodiment, revoking the sharing of the target mail may include cases described below. The sharer party actively revokes the sharing; the sharer party leaves the group; the sharer party disbands the group; or the ownership of the sharer party is transferred. Partially revoking the sharing of the target mail may include the case where the sharee party leaves the group, etc. The mail operation authority of the sharee party in the sharing group may be revoked or partially revoked to revoke or partially revoke the sharing of the target mail.

In an example, the sharer may click on a sharing revoking button to trigger the generation of the mail sharing revoking instruction, so that the sharer party can actively withdraw the sharing of the target mail. After receiving the mail sharing revoking instruction sent by the sharer party, the server may search for all sharee parties having the mail operation authority for the target mail in the sharing group, and revoke the mail operation authority of all sharee parties for the target mail, so that the sharees cannot perform an operation on the target mail anymore.

In another example, the sharer may click on a group leaving button displayed on the display interface of the sharing group to trigger the generation of the first group leaving operation instruction, so that the sharer party can leave the sharing group and withdraw the sharing of the target mail. After receiving the first group leaving operation instruction sent by the sharer party, the server removes the sharer party from the sharing group, at the same time, searches for all sharee parties having the mail operation authority for the target mail in the sharing group, and revokes the mail operation authority of all sharee parties for the target mail, so that the sharees cannot perform an operation on the target mail anymore.

In another example, the sharer selects a target group member in the sharing group when clicking on a group leaving button, and thus triggers the generation of the ownership transfer instruction, so as to transfer the ownership of the sharing group to the selected target group member, and withdraw the sharing of the target mail. In another example, after the sharer leaves the sharing group, the generation of the ownership transfer instruction is automatically triggered, the ownership of the sharing group is transferred to a target group member according to the preset transfer rule, and the sharing of the target mail is withdrawn. The preset transfer rule may be, for example, a default transfer of the ownership to the group member displayed and arranged next to the avatar of the group owner. After receiving the ownership transfer instruction sent by the sharer party, the server may transfer the ownership of the sharer party and the group operation authority to a specified or default target group member in the sharing group.

In another example, the sharer may click on a group disbanding button displayed on the display interface of the sharing group to trigger the generation of the group disbanding operation instruction, so that the sharing group is disbanded and the sharing of the target mail is withdrawn. After receiving the group disbanding operation instruction sent by the sharer party, the server disbands the sharing group, at the same time, searches for all sharee parties having the mail operation authority for the target mail in the sharing group, and revokes the mail operation authority of all sharee parties for the target mail, so that the sharees cannot perform an operation on the target mail anymore.

In another example, the sharer party has the ownership in the sharing group, and the sharee party is a group member of the sharing group. Based on this, the sharer party may revoke the sharing of the target mail by transferring the ownership. For example, the sharer may select a target group member in the sharing group and clicks on an ownership transfer button from a pop-up menu to trigger the generation of the ownership transfer instruction, so as to transfer the ownership of the sharing group to the selected target group member, and withdraw the sharing of the target mail. For another example, after the sharer leaves the sharing group, the generation of the ownership transfer instruction is automatically triggered, the ownership of the sharing group is transferred to a target group member according to the preset transfer rule, and the sharing of the target mail is withdrawn. The preset transfer rule may be, for example, a default transfer of the ownership to the group member displayed and arranged next to the avatar of the group owner. After receiving the ownership transfer instruction sent by the sharer party, the server disbands the sharing group, at the same time, searches for all sharee parties having the mail operation authority for the target mail in the sharing group, and revokes the mail operation authority of all sharee parties for the target mail, so that the sharees cannot perform an operation on the target mail anymore.

In another example, a target sharee may click on a group leaving button displayed on the display interface of the sharing group to trigger the generation of the second group leaving operation instruction, so that the target sharee party leaves the sharing group, and the target mail shared with the target sharee is withdrawn. After receiving the second group leaving operation instruction sent by the target sharee party, the server removes the target sharee party from the sharing group, and at the same time, revokes the mail operation authority of the target sharee party for the target mail, so that the target sharee cannot perform an operation on the target mail anymore.

According to the technical schemes of the embodiment, the mail sharing request sent by the sharer party based on the target mail is received, where the mail sharing request includes the operation authority allocation instruction sent by the sharer party to the sharee party, the sharing group including the sharer party and the sharee party is created according to the mail sharing request, at the same time, the mail operation authority is allocated to the sharee according to the operation authority allocation instruction, and the target mail is shared with the sharee party, to enable the sharer party and the sharee party to perform information interaction based on the target mail. In this way, different mail operation authorities are set for different sharee parties, so that multi-party collaborative operations can be performed on the shared mail, and the information interaction efficiency of multi-party collaborative communication is improved.

Embodiment Four

Figure 4:
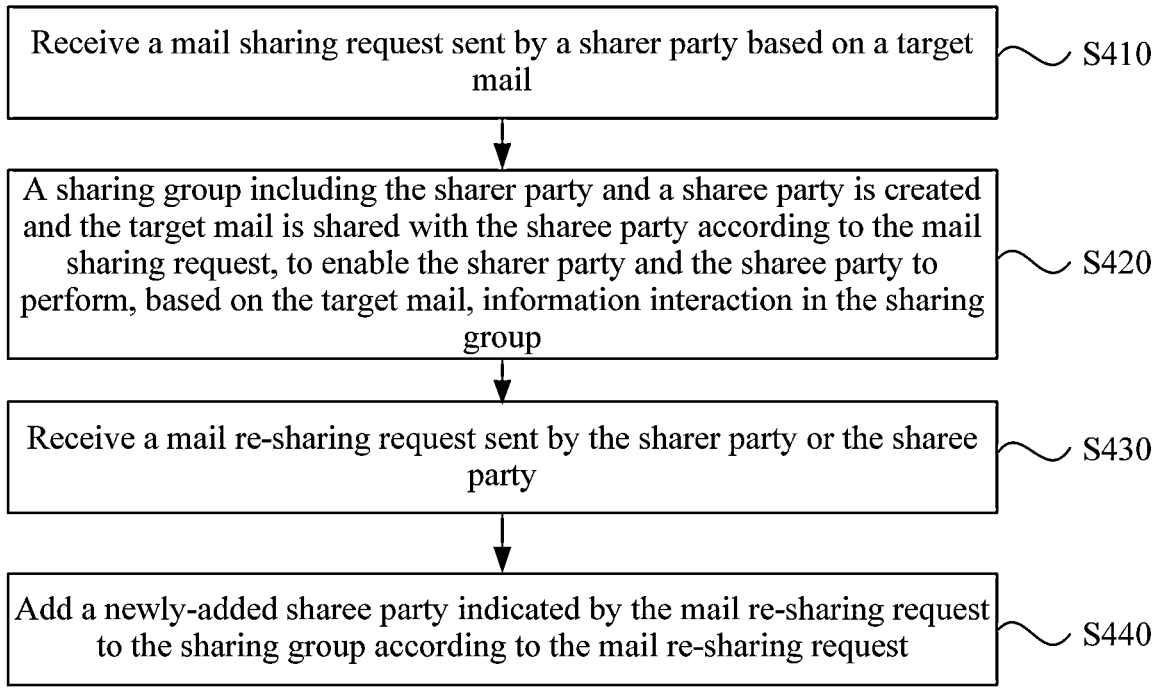
FIG. 4 is a flowchart of an information interaction method according to embodiment four of the present disclosure.

FIG. 4 is a flowchart of an information interaction method according to embodiment four of the present disclosure. The embodiment is described based on multiple optional schemes in the preceding embodiments and provides an optional information interaction method. The step in which the operation instruction for the sharing group is received includes that a mail re-sharing request sent by the sharer party or the sharee party is received. Correspondingly, the step in which the operation is performed on the sharing group according to the operation instruction includes that a newly-added sharee party indicated by the mail re-sharing request is added to the sharing group according to the mail re-sharing request. The steps described below are included.

In S410, a mail sharing request sent by a sharer party based on a target mail is received.

In S420, a sharing group including the sharer party and a sharee party is created and the target mail is shared with the sharee party according to the mail sharing request, to enable the sharer party and the sharee party to perform, based on the target mail, information interaction in the sharing group.

In S430, a mail re-sharing request sent by the sharer party or the sharee party is received.

In the embodiment, the operation of performing management on the sharing group may be embodied as that a new group member, that is, a newly-added sharee party, is added to the sharing group. In this way, the newly-added sharee party can also perform information interaction with other group members together in the sharing group based on the shared target mail.

Exemplarily, after the first sharing of the target mail, the second sharing may also be performed. The sharer party or the sharee party may initiate the second sharing based on the shared target mail, and the server may share the target mail with the newly-added sharee party after receiving the mail re-sharing request of the sharer party or the sharee party based on the target mail. The manner of initiating the second sharing includes, but is not limited to, inviting the newly-added sharee party to join the sharing group.

A discussion group displayed on a mail client is taken as an example. A group member adding identifier may be set in a mail content displaying window of the mail client or in a status bar corresponding to the discussion group. When the group member adding identifier is triggered, a candidate window may pop up to display identity information of candidate sharees, and the sharer or a sharee having a sharing authority may select a candidate sharee to initiate a re-sharing request. For example, as shown in FIG. 2B, a user may initiate a mail re-sharing request by triggering the group member adding identifier 103 displayed in the status bar 100 of the discussion group 10.

In an embodiment, the method may further include that if it is determined that the sharing group is in a state that only the sharer party is able to re-share, reception of the mail re-sharing request sent by the sharee party is prohibited.

To constrain a group management authority of each sharee party in the sharing group, the sharer party may set the sharing group in a state that only the sharer party is able to re-share, for example, select an option of re-sharing only by the group owner in the sharing group, to prohibit the sharee party from pulling other people into the group. In this way, the security of the sharing group and the target mail can be improved.

In S440, a newly-added sharee party indicated by the mail re-sharing request is added to the sharing group according to the mail re-sharing request.

In the embodiment, after receiving the mail re-sharing request, the server may add the newly-added sharee party indicated by the mail re-sharing request to the sharing group. The mail re-sharing request may include an identity identifier of the newly-added sharee party selected by the sharer party or the sharee party who initiates the request, and the server may add the newly-added sharee party to the sharing group according to the identity identifier of the newly-added sharee party. The newly-added sharee party may be added to the sharing group, so that the shared target mail is shared with the newly-added sharee party.

On the basis of the preceding embodiments, in an embodiment, when the sharer party or the sharee party invites a newly-added sharee party to join the sharing group, the sharer party or the sharee party may allocate, within the range of the group management authority of their own, a group management authority not greater than the group management authority of their own to the newly-added sharee party. That is, for example, a sharee having the authority of adding a new member to the group may allocate the authority of adding a new member to the group to a newly-added sharee when inviting the newly-added sharee to join the group.

In an embodiment, after the newly-added sharee party indicated by the mail re-sharing request is added to the sharing group, the method further includes the following step: the sharing group is started in the newly-added sharee party, and all corresponding history messages are displayed in the sharing group of the newly-added sharee party.

Exemplarily, the sharing group being started may be that the sharing group is opened and a group message in the sharing group is acquired and displayed in time. After the sharing group is started in the newly-added sharee party, all corresponding history messages may be displayed in the sharing group of the newly-added sharee party. That is, the newly-added sharee party may pull all history message records corresponding to the sharing group from the server, including, but not limited to, text information, voice information and information related to the target mail sent by group members when performing information interaction in the sharing group.

All corresponding history messages are displayed in the sharing group of the newly-added sharee party, so that the newly-added sharee party can know the information interaction content in the sharing group quickly, which is convenient for the newly-added sharee to perform information interaction continuously with other members in the sharing group based on the current information interaction content.

According to the technical schemes of the embodiment, the mail re-sharing request sent by the sharer party or the sharee party is received, and the newly-added sharee party indicated by the mail re-sharing request is added to the sharing group according to the mail re-sharing request. In this way, the second sharing of the target mail is performed in the manner of adding the newly-added sharee party into the sharing group, so that the information interaction efficiency of multi-party collaborative communication and the group management efficiency are improved.

Embodiment Five

Figure 5A:
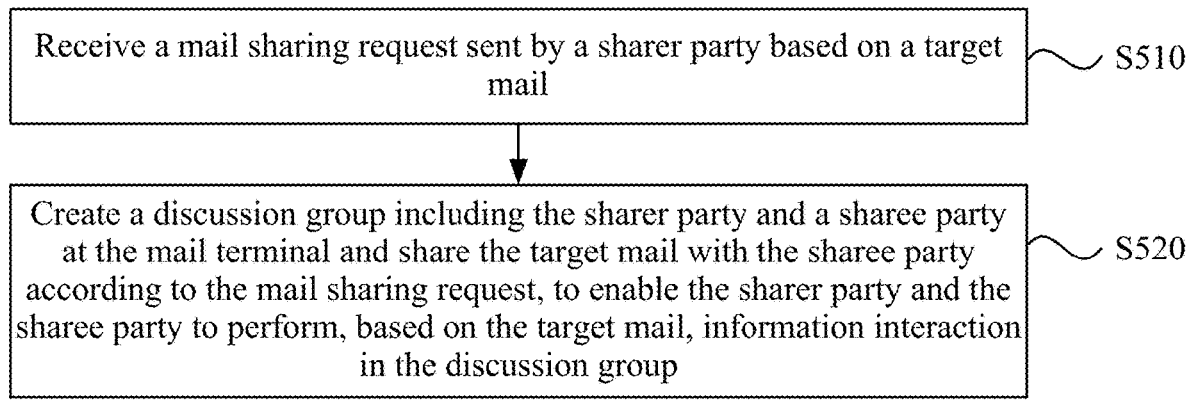
FIG. 5A is a flowchart of an information interaction method according to embodiment five of the present disclosure.

FIG. 5A is a flowchart of an information interaction method according to embodiment five of the present disclosure. The method may be applied to the case of information interaction between a sharer and a sharee, and the method may be executed by an electronic device such as a computer and a server. The method includes the steps described below.

In S510, a mail sharing request sent by a sharer party based on a target mail is received.

Different from the creation of a sharing group in the preceding embodiments, in the embodiment, a discussion group is created in a mail server based on the target mail shared by the sharer party, and the discussion group is displayed on a mail client of the sharer party and a mail client of a sharee party, so that the sharer party and the sharee party perform, based on the target mail, information interaction in the discussion group. A mail terminal may refer to the mail server, the mail client of the sharer party and the mail client of the sharee party.

In the embodiment, the target mail may be a mail that the sharer party needs to share with the sharee party. The target mail may come from the mail terminal, or may come from an IM terminal. The sharer party may be the client used by the sharer of the target email, and the sharee party may be the client used by the sharee of the target email. Exemplarily, the case where the target mail comes from the mail terminal may include, for example, that the sharer party shares, based on a newly-created draft or a received mail, the newly-created draft or the received mail. The case where the target mail comes from the IM terminal may include, for example, that the sharer party re-shares a mail that has been shared with the IM terminal.

When sending the mail sharing request, the sharer party may specify one sharee party or may specify multiple sharee parties, that is, the sharer party may share the target mail with one sharee party or may share the target mail with multiple sharee parties, which is not limited here.

In an embodiment, the target mail includes at least one mail draft or multiple associated mails having the same feature information. The target mail involved in the embodiment may be one or more mail drafts or multiple associated mails having the same feature information. The mail draft may be a new draft created separately by the sharer party, and the associated mails having the same feature information may be a mail set composed of multiple mails having at least one of the following pieces of feature information: the same subject, a sending time being within a preset time range, the same sender, the same recipient, a reply reference relationship or a forwarding reference relationship.

The sharer may initiate the mail sharing request for the target mail on the mail client used by the sharer to share the target mail. The client used by the sharer may include a computer client or a mobile phone client. The manner in which the sharer party initiates the mail sharing request includes, but is not limited to, that the sharer clicks on a button representing a sharing function in a display interface of the target mail, thereby triggering the generation of the mail sharing request for the target mail.

For a specific example, reference may be made to the description of FIG. 1B in embodiment one, which is not repeated here.

In S520, a discussion group including the sharer party and a sharee party is created at the mail terminal and the target mail is shared with the sharee party according to the mail sharing request, to enable the sharer party and the sharee party to perform, based on the target mail, information interaction in the discussion group.

In the embodiment, after receiving the mail sharing request sent by the sharer party, the server may create a discussion group including the sharer party and at least one sharee party at the mail terminal based on the target mail, that is, create a discussion group associated with the target mail, and add the sharer party and the sharee party to the discussion group as group members of the discussion group. The manner of sharing the target mail with the sharee party includes, but is not limited to, displaying the target mail in association based on the created discussion group, so that the sharer party and the sharee party can perform information interaction in the sharing group based on the target mail. After the discussion group is created, the sharer party and the sharee party which are members of the discussion group may perform online multi-party collaborative information interaction in the discussion group based on the displayed target mail. The information interaction manner includes, but is not limited to, text interaction, voice interaction, video interaction, collaborative editing and the like.

In the embodiment, the mail sharing refers to that the sharer party shares the target mail with the sharee party in the manner of creating a group, so that the sharee party can view and/or edit the target mail. However, the sharee party actually cannot really own the target mail, that is, the target mail obtained by the sharee party by sharing will be automatically deleted as the sharing ends.

In an embodiment, after the mail sharing request sent by the sharer party based on the target mail is received, the method further includes the following step: a sharing tag is added to the target mail, and the sharing tag is displayed in association with the target mail.

Exemplarily, the sharing tag may be a dedicated tag set by the mail terminal for mail sharing. When the target mail is in a sharing state, the sharing tag may be added to the target mail, so that the target mail can be distinguished from other unshared mails and displayed to facilitate the search by a user. At the same time, the sharing tag may be displayed in association with the target mail. The association displaying manner includes, but is not limited to, displaying the sharing tag while displaying the target mail.

In an embodiment, the step in which the sharing tag is displayed in association with the target mail includes the following steps: mail information of the target mail is displayed in a mail list in a sharing tab of the mail terminal; and/or, the target mail displayed in another tab of the mail terminal is marked by using the sharing tag.

Figure 5B:
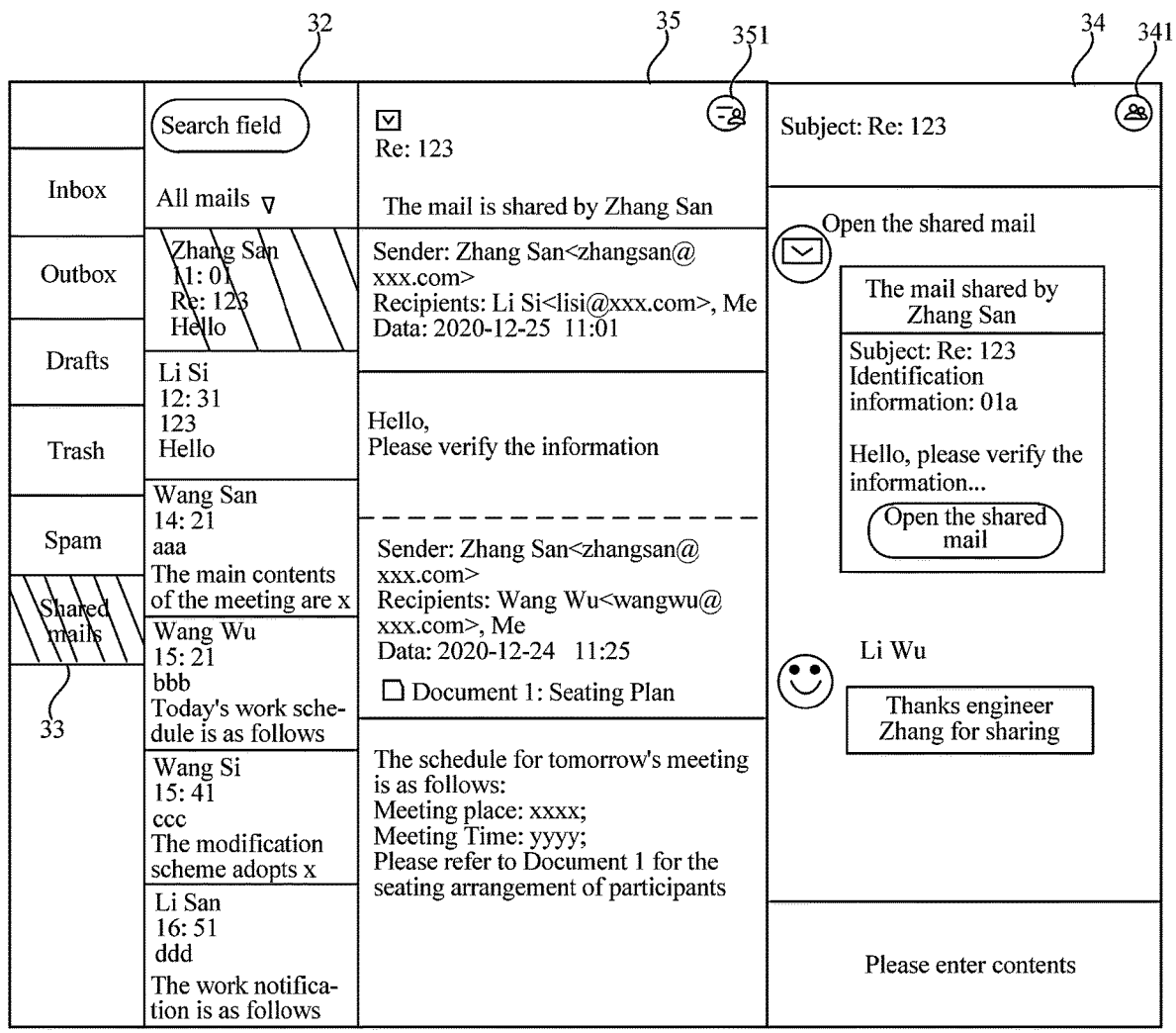
FIG. 5B is a schematic diagram of a display interface of a mail client according to embodiment five of the present disclosure.

Exemplarily, the sharing tab may be set separately on the mail client. For example, as shown in FIG. 5B, when the user clicks on the sharing tab 33, the corresponding mail list 32 may be displayed. Mails displayed in the mail list 32 are mails all having the sharing tag. After the sharing tag is added to the target mail, the mail information of the target mail, such as the mail information of the target mail shared by Zhang san shown in FIG. 5B, may be displayed in the mail list under the sharing tab.

The target mail displayed in another tab of the mail terminal may also be marked. For example, in the mail client of the sharer party, if the target mail is originally a mail in the inbox, when the mail information of the target mail is displayed in the tab of the inbox tab, the words of "Shared mail" are marked on the mail information of the target mail.

In an embodiment, the step in which the discussion group including the sharer party and the sharee party is created at the mail terminal includes the following step: the discussion group including the sharer party and the sharee party is created and is displayed based on a display position of a mail content displaying window of the mail terminal, where the mail content displaying window is configured to expand and display a mail content of the target mail.

The mail content displaying window may be a window for displaying the mail content in the mail terminal. A specific mail may be selected to switch the mail content displayed in the mail content displaying window, so as to display the mail content corresponding to the selected specific mail.

In the embodiment, the discussion group created at the mail terminal may be displayed on one side of the mail content displaying window. For example, in FIG. 5B, the discussion group 34 is displayed on the right side of the mail content displaying window 35, so that the user can view the mail content of the target mail while discussing in the discussion group, and the interaction efficiency is improved based on the mail content.

In an embodiment, the target mail displayed in the mail content displaying window is marked with a corresponding sharer party identifier.

Exemplarily, for ease of the user viewing the sharing source of the target mail, the corresponding sharer party identifier may be displayed in the status bar of the window while the content of the target mail is displayed in the mail content displaying window. For example, as shown in FIG. 5B, the words of "Mail shared by Zhang San" are displayed in the lower left of the status bar of the mail content displaying window 35.

In an embodiment, after the step in which the discussion group including the sharer party and the sharee party is created and is displayed based on the display position of the mail content displaying window of the mail terminal, the method further includes the following step: a discussion group icon is displayed in the mail content displaying window, where the discussion group icon is configured to, when triggered, enable the discussion group to pop up or hide.

In the embodiment, the discussion group icon may further be displayed in the mail content displaying window, and the user may click on the discussion group icon to enable the discussion group to pop up or hide. For example, as shown in FIG. 5B, the discussion group icon 351 is displayed in the upper right corner of the status bar of the mail content displaying window 35. The discussion group icon is set, so that it is convenient for the user to open or hide the display interface of the discussion group corresponding to the shared mail, facilitating the user to use.

In an embodiment, after the step in which the discussion group including the sharer party and the sharee party is created and is displayed based on the display position of the mail content displaying window of the mail terminal, the method further includes the following step: a new message reminding manner of the discussion group is determined according to a current display state of the discussion group.

The user may set the current display state of the discussion group according to requirements. The current display state of the discussion group in the embodiment includes, but is not limited to, a hidden state, a non-hidden state, a silent mode, a non-silent mode, etc. When the discussion group is in different states, the discussion group corresponds to different new message reminding manners. The new message reminding may be performed in the case where the discussion group has new information or new member joining, etc. The new message reminding manner includes, but is not limited to, sound reminding, icon reminding, number reminding, etc.

In an embodiment, the step in which the new message reminding manner of the discussion group is determined according to the current display state of the discussion group includes the following step: if the discussion group is currently in a hidden state and is in a non-silent mode, new message reminding is performed in a first reminding manner based on the discussion group icon and/or the mail information of the target mail.

In an embodiment, the step in which the new message reminding manner of the discussion group is determined according to the current display state of the discussion group includes the following step: if the discussion group is currently in a hidden state and is in a silent mode, new message reminding is performed in a second reminding manner based on the discussion group icon.

In the embodiment, if the discussion group is currently in a display state, the information in the discussion group may be updated and displayed directly. The manner of directly updating and displaying the information in the discussion group includes, but is not limited to, text information or voice information sent by the sharer party or the sharee party, and text prompt information and/or voice prompt information of a new member joining or leaving the sharing group. If the discussion group is currently in the non-silent mode at the same time, corresponding sounding reminding may be performed while the information in the discussion group is updated and displayed.

Exemplarily, if the discussion group is currently in the hidden state, the new message reminding manner of the discussion group may be determined according to whether the discussion group is currently in the silent mode at the same time. If the discussion group is currently in the hidden state and is in the non-silent mode, the new message reminding is performed in the first reminding manner based on the discussion group icon and/or the mail information of the target mail. The first reminding manner includes, but is not limited to, displaying the number (such as a red number) of unread messages in a bright color on the discussion group icon, and/or displaying the discussion icon on the mail information of the target mail, etc. In addition, if the discussion group is currently in the hidden state and in the silent mode, the new message reminding is performed in the second reminding manner based on the discussion group icon. The second reminding manner includes, but is not limited to, displaying the number of unread messages in an inconspicuous color on the discussion group icon, and/or merely identifying with a red dot on the discussion group icon, etc., which can be personalized according to requirements of the user and is not limited here.

Distinguishing new message reminding manners are performed according to different states of the discussion group, so that the user can change the display and reminding manner of the discussion group according to requirements of the user, and personalized selection requirements of the user are satisfied and the interactivity is increased.

According to the technical schemes of the embodiment, the mail sharing request sent by the sharer party based on the target mail is received, and the discussion group including the sharer party and the sharee party is created at the mail terminal and the target mail is shared with the sharee party according to the mail sharing request, to enable the sharer party and the sharee party to perform information interaction in the discussion group based on the target mail. Communication is conducted in the group created at the mail terminal based on the shared mail, so that the problem is solved that in the related art, the mail is first forwarded to each sharee party, and then communication is conducted with multiple sharee parties one by one or an offline face-to-face meeting is held for discussion, leading to low information interaction efficiency. Therefore, the information interaction efficiency of multi-party collaborative communication is improved.

On the basis of the preceding embodiments, in an embodiment, after the target mail is shared with the sharee party, the method further includes the following steps: a mail re-sharing request sent by the sharer party or the sharee party is received; and the target mail is shared with a newly-added sharee party indicated by the mail re-sharing request according to the mail re-sharing request.

In an embodiment, after the target mail is shared with the newly-added sharee party indicated by the mail re-sharing request, the method further includes the following step: the newly-added sharee party is added to the discussion group.

A re-sharing button may be set in the mail content displaying window of the mail client or the status bar corresponding to the discussion group. When the re-sharing button is triggered, a candidate window may pop up to display identity information of candidate sharees, and the sharer or the sharee having sharing authority may initiate a re-sharing request by selecting a candidate sharee. For example, as shown in FIG. 5B, the user may initiate a mail re-sharing request by triggering the re-sharing button 341 displayed in the status bar of the discussion group 34.

In an embodiment, after the discussion group including the sharer party and the sharee party is created at the mail terminal, the method further includes the following step: the discussion group is started at the mail terminal of the sharer party and the mail terminal of the sharee party respectively.

In an embodiment, after the discussion group including the sharer party and the sharee party is created at the mail terminal, the method further includes the following step: the discussion group is started at the mail terminal of the sharer party, and a discussion group creation prompt is displayed on the mail terminal of the sharee party. The discussion group creation prompt is used for prompting the sharee party that a new discussion group is created; and the discussion group is started at the mail terminal of the sharee party after a viewing operation instruction of the sharee party is received.

In an embodiment, the mail sharing request includes an operation authority allocation instruction sent by the sharer party to the sharee party.

After the mail sharing request sent by the sharer party based on the target mail is received, the method further includes the following step: a mail operation authority is allocated to the sharee party according to the operation authority allocation instruction.

In an embodiment, the mail operation authority includes at least one of editing authority, reading authority or sharing authority.

In an embodiment, the method further includes the following step: a group operation instruction sent by the sharer party or the sharee party is received, and the mail operation authority of the sharee party is revoked or partially revoked according to the group operation instruction.

In an embodiment, the step in which the group operation instruction sent by the sharer party or the sharee party is received, and the mail operation authority of the sharee party is revoked or partially revoked according to the group operation instruction includes the following steps: a first group leaving operation instruction sent by the sharer party is received; and the sharer party is removed from the discussion group according to the first group leaving operation instruction, and the mail operation authority of the sharee party in the discussion group is revoked.

In an embodiment, the step in which the group operation instruction sent by the sharer party or the sharee party is received, and the mail operation authority of the sharee party is revoked or partially revoked according to the group operation instruction includes the following steps: a group disbanding operation instruction sent by the sharer party is received; and the discussion group is disbanded according to the group disbanding operation instruction, and the mail operation authority of the sharee party in the discussion group is revoked.

In an embodiment, the step in which the group operation instruction sent by the sharer party or the sharee party is received, and the mail operation authority of the sharee party is revoked or partially revoked according to the group operation instruction includes the following steps: a second group leaving operation instruction sent by a target sharee party is received; and the target sharee party is removed from the discussion group according to the second group leaving operation instruction, and mail operation authority of the target sharee party is revoked.

In an embodiment, the target mail includes at least one mail draft or multiple associated mails having the same feature information.

With regard to the explanation of the preceding multiple optional technical schemes, reference may be made to the explanation of the technical schemes corresponding to the sharing group in the preceding embodiments, and the principles of the two are the same, which are not repeated here.

Embodiment Six

Figure 6:
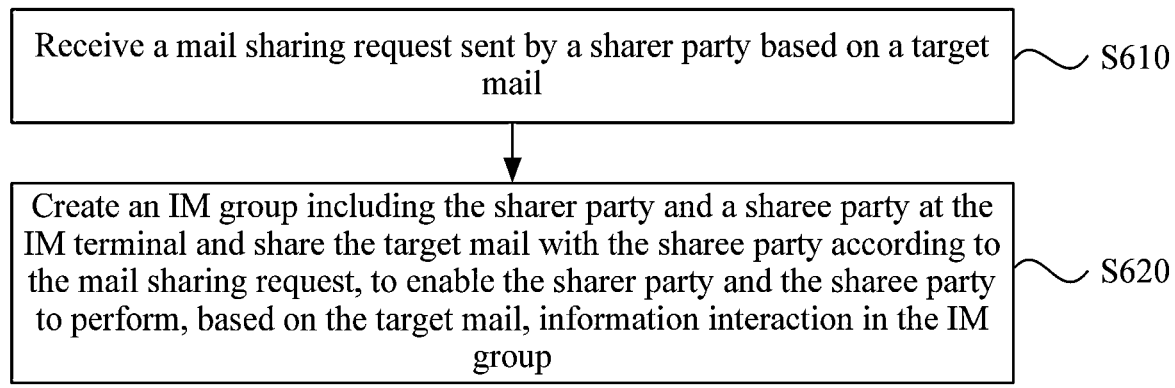
FIG. 6 is a flowchart of an information interaction method according to embodiment six of the present disclosure.

FIG. 6 is a flowchart of an information interaction method according to embodiment six of the present disclosure. The method may be applied to the case of information interaction between a sharer and a sharee, and the method may be executed by an electronic device such as a computer and a server. The method includes the steps described below.

In S610, a mail sharing request sent by a sharer party based on a target mail is received.

Different from the created sharing group or the discussion group created at a mail terminal in the preceding embodiments, in the embodiment, an IM group is created in an IM server based on the target mail shared by the sharer party, and the IM group is displayed on an IM client of the sharer party and an IM client of a sharee party, so that the sharer party and the sharee party perform, based on the target mail, information interaction in the IM group. An IM terminal may refer to the IM server, the IM client of the sharer party and the IM client of the sharee party.

In the embodiment, the target mail may be a mail that the sharer party needs to share with the sharee party. The target mail may come from the mail terminal, or may come from the IM terminal. The sharer party may be the client used by the sharer of the target email, and the sharee party may be the client used by the sharee of the target email. Exemplarily, the case where the target mail comes from the mail terminal may include, for example, that the sharer party shares, based on a newly-created draft or a received mail, the newly-created draft or the received mail. The case where the target mail comes from the IM terminal may include, for example, that the sharer party re-shares a mail that has been shared with the IM terminal.

When sending the mail sharing request, the sharer party may specify one sharee party or may specify multiple sharee parties, that is, the sharer party may share the target mail with one sharee party or may share the target mail with multiple sharee parties, which is not limited here.

In an embodiment, the target mail includes at least one mail draft or multiple associated mails having the same feature information. The target mail involved in the embodiment may be one or more mail drafts or multiple associated mails having the same feature information. The mail draft may be a new draft created separately by the sharer party, and the associated mails having the same feature information may be a mail set composed of multiple mails having at least one of the following pieces of feature information: the same subject, a sending time being within a preset time range, the same sender, the same recipient, a reply reference relationship or a forwarding reference relationship.

The sharer may initiate the mail sharing request for the target mail on the IM client used by the sharer to share the target mail. The client used by the sharer may include a computer client or a mobile phone client. The manner in which the sharer party initiates the mail sharing request includes, but is not limited to, that the sharer clicks on a button representing a sharing function in a display interface of the target mail, thereby triggering the generation of the mail sharing request for the target mail.

For an example, reference may be made to the description of FIG. 1B in embodiment one, which is not repeated here.

In S620, an IM group including the sharer party and a sharee party is created at the IM terminal and the target mail is shared with the sharee party according to the mail sharing request, to enable the sharer party and the sharee party to perform, based on the target mail, information interaction in the IM group.

In the embodiment, after receiving the mail sharing request sent by the sharer party, the server may create an IM group including the sharer party and at least one sharee party at the IM terminal based on the target mail, that is, create an IM group associated with the target mail, and add the sharer party and the sharee party to the IM group as group members of the IM group. The manner of sharing the target mail with the sharee party includes, but is not limited to, displaying the target mail in association based on the created IM group, so that the sharer party and the sharee party can perform information interaction in the IM group based on the target mail. After the IM group is created, the sharer party and the sharee party which are members of the IM group may perform online multi-party collaborative information interaction in the IM group based on the displayed target mail. The information interaction manner includes, but is not limited to, text interaction, voice interaction, video interaction, collaborative editing and the like.

In the embodiment, the mail sharing refers to that the sharer party shares the target mail with the sharee party in the manner of creating a group, so that the sharee party can view and/or edit the target mail. However, the sharee party actually cannot really own the target mail, that is, the target mail obtained by the sharee party by sharing will be automatically deleted as the sharing ends.

In an embodiment, the step in which the target mail is shared with the sharee party includes the following steps: An association relationship between the target mail and a group identifier corresponding to the IM group is established; and the IM group is displayed in association with the target mail according to the association relationship.

In the embodiment, the association relationship between the target mail and the group identifier corresponding to the IM group may be established to display the IM group in association with the target mail. The manner in which the association relationship is established includes, but is not limited to, storing a mail link corresponding to the target mail in a database storing the group identifier of the IM group, etc. In addition, the step in which the IM group is displayed in association with the target mail may be that the target mail is displayed in the IM group, or the target mail is displayed on a relevant position outside the IM group, which is not limited here.

In an embodiment, the step in which the IM group is displayed in association with the target mail includes the following steps: mail information of the target mail is displayed in a form of a mail card in the IM group; and/or, a mail content displaying window is constructed based on a display position of the IM group, and a mail content of the target mail is expanded and displayed in the mail content displaying window.

In an embodiment, before the step in which the mail content displaying window is constructed based on the display position of the IM group, and the mail content of the target mail is expanded and displayed in the mail content displaying window, the method further includes the following step: it is determined that a triggering operation instruction for the mail card is received.

In the embodiment, the mail information of the target mail may be displayed in the mail card, and the mail card may also be a displaying form for opening the link for displaying the mail content displaying window. The mail information of the target mail may include at least one of a mail name, sender information, recipient information or partial information of the mail content.

Exemplarily, the sharer or the sharee may open the mail content displaying window by clicking on the mail card displayed in the IM group, and the mail content of the target mail is expanded and displayed in the mail content displaying window. Of course, a mail content displaying button may further be separately set, and the button is clicked on to open the mail content displaying window. The opening manner is not limited here.

For an example, reference may be made to the description of FIG. 1C in embodiment one, which is not repeated here.

According to the technical schemes of the embodiment, the mail sharing request sent by the sharer party based on the target mail is received, and the IM group including the sharer party and the sharee party is created at the IM terminal and the target mail is shared with the sharee party according to the mail sharing request, to enable the sharer party and the sharee party to perform information interaction in the IM group based on the target mail. Communication is conducted in the group created at the IM terminal based on the shared mail, so that the problem is solved that in the related art, the mail is first forwarded to each sharee party, and then communication is conducted with multiple sharee parties one by one or an offline face-to-face meeting is held for discussion, leading to low information interaction efficiency. Therefore, the information interaction efficiency of multi-party collaborative communication is improved.

On the basis of the preceding embodiments, in an embodiment, after the IM group including the sharer party and the sharee party is created at the IM terminal, the method further includes the following step: the IM group is started at the IM terminal of the sharer party and the IM terminal of the sharee party respectively.

In an embodiment, after the IM group including the sharer party and the sharee party is created at the IM terminal, the method further includes the following step: the IM group is started in the sharer party; and an IM group creation prompt is displayed on the sharee party, where the IM group creation prompt is used for prompting the sharee party that a new IM group is created; and the IM group is started in the sharee party after a viewing operation instruction of the sharee party is received.

In an embodiment, after the target mail is shared with the sharee party, the method further includes the following steps: a mail re-sharing request sent by the sharer party or the sharee party is received; and the target mail is shared with a newly-added sharee party indicated by the mail re-sharing request according to the mail re-sharing request.

In an embodiment, after the target mail is shared with the newly-added sharee party indicated by the mail re-sharing request, the method further includes the following step: the newly-added sharee party is added to the IM group.

In an embodiment, the mail sharing request includes an operation authority allocation instruction sent by the sharer party to the sharee party.

After the mail sharing request sent by the sharer party based on the target mail is received, the method further includes the following step: a mail operation authority is allocated to the sharee party according to the operation authority allocation instruction.

In an embodiment, the mail operation authority includes at least one of editing authority, reading authority or sharing authority.

In an embodiment, the method further includes the following step: a group operation instruction sent by the sharer party or the sharee party is received, and the mail operation authority of the sharee party is revoked or partially revoked according to the group operation instruction.

In an embodiment, the step in which the group operation instruction sent by the sharer party or the sharee party is received, and the mail operation authority of the sharee party is revoked or partially revoked according to the group operation instruction includes the following steps: a mail sharing revoking instruction sent by the sharer party is received; and the mail operation authority of the sharee party is revoked according to the mail sharing revoking instruction.

In an embodiment, the step in which the group operation instruction sent by the sharer party or the sharee party is received, and the mail operation authority of the sharee party is revoked or partially revoked according to the group operation instruction includes the following steps: a first group leaving operation instruction sent by the sharer party is received; and the sharer party is removed from the IM group according to the group leaving operation instruction, and the mail operation authority of the sharee party in the IM group is revoked.

In an embodiment, the step in which the group operation instruction sent by the sharer party or the sharee party is received, and the mail operation authority of the sharee party is revoked or partially revoked according to the group operation instruction includes the following steps: a group disbanding operation instruction sent by the sharer party is received; and the IM group is disbanded according to the group disbanding operation instruction, and the mail operation authority of the sharee party in the IM group is revoked.

In an embodiment, the step in which the group operation instruction sent by the sharer party or the sharee party is received, and the mail operation authority of the sharee party is revoked or partially revoked according to the group operation instruction includes the following steps: a second group leaving operation instruction sent by a target sharee party is received; and the target sharee party is removed from the IM group according to the second group leaving operation instruction, and a mail operation authority of the target sharee party is revoked.

In an embodiment, the step in which the group operation instruction sent by the sharer party or the sharee party is received, and the mail operation authority of the sharee party is revoked or partially revoked according to the group operation instruction includes the following steps: an ownership transfer instruction sent by the sharer party is received; and ownership of the sharer party and a group operation authority of the sharer party are transferred to a target group member in the IM group according to the ownership transfer instruction, and the mail operation authority of the sharee party in the IM group is revoked.

With regard to the explanation of the preceding multiple optional technical schemes, reference may be made to the explanation of the technical schemes corresponding to the sharing group in the preceding embodiments, and the principles of the two are the same, which are not repeated here.

Embodiment Seven

Figure 7A:
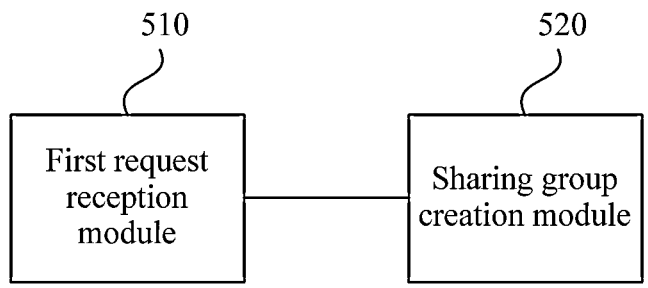
FIG. 7A is a structural diagram of an information interaction apparatus according to embodiment seven of the present disclosure.

FIG. 7A is a structural diagram of an information interaction apparatus according to embodiment seven of the present disclosure. Referring to FIG. 7A, the information interaction apparatus includes a first request reception module 510 and a sharing group creation module 520. Multiple modules are described below.

The first request reception module 510 is configured to receive a mail sharing request sent by a sharer party based on a target mail. The sharing group creation module 520 is configured to create a sharing group including the sharer party and a sharee party and share the target mail with the sharee party according to the mail sharing request, to enable the sharer party and the sharee party to perform, based on the target mail, information interaction in the sharing group.

According to the information interaction apparatus provided by the embodiment, the mail sharing request sent by the sharer party based on the target mail is received, and the sharing group including the sharer party and the sharee party is created and the target mail is shared with the sharee party according to the mail sharing request, to enable the sharer party and the sharee party to perform information interaction in the sharing group based on the target mail. Communication is conducted in the group created based on the shared mail, so that the problem is solved that in the related art, the mail is first forwarded to each sharee party, and then communication is conducted with multiple sharee parties one by one or an offline face-to-face meeting is held for discussion, leading to low information interaction efficiency. Therefore, the information interaction efficiency of multi-party collaborative communication is improved.

In an embodiment, the mail sharing request may include a sharer party identifier and a sharee party identifier. The sharing group creation module 520 may include an identifier creation sub-module and an identifier allocation sub-module. The identifier creation sub-module is configured to create the sharing group including the sharer party and the sharee party according to the sharer party identifier and the sharee party identifier, where the sharing group is allocated with a corresponding group identifier. The identifier allocation sub-module is configured to send the group identifier to the sharer party and the sharee party to enable the sharer party and the sharee party to acquire a group message of the sharing group in real time according to the group identifier.

In an embodiment, the sharing group creation module 520 may further include a first starting sub-module. The first starting sub-module is configured to after the group identifier is sent to the sharer party and the sharee party, start the sharing group in the sharer party and the sharee party respectively according to the group identifier.

In an embodiment, the sharing group creation module 520 may further include a second starting sub-module and a creation prompt sub-module. The second starting sub-module is configured to after the group identifier is sent to the sharer party and the sharee party, start the sharing group in the sharer party according to the group identifier. The creation prompt sub-module is configured to display a sharing group creation prompt on the sharee party, where the sharing group creation prompt is used for prompting the sharee party that a new sharing group is created, and start the sharing group in the sharee party after a viewing operation instruction of the sharee party is received.

In an embodiment, the apparatus may further include a mail displaying module. The mail displaying module is configured to after the target mail is shared with the sharee party, display the target mail to the sharer party and/or the sharee party.

In an embodiment, the mail displaying module may include an information displaying sub-module and/or a content displaying sub-module. The information displaying sub-module is configured to display mail information of the target mail in a form of a mail card in the sharing group. The content displaying sub-module is configured to construct a mail content displaying window, and expand and display a mail content of the target mail in the mail content displaying window.

Figure 7B:
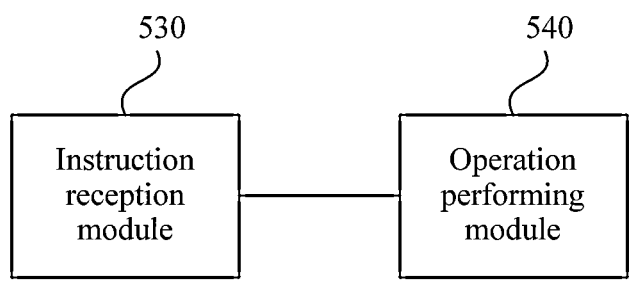
FIG. 7B is a structural diagram of another information interaction apparatus according to embodiment seven of the present disclosure.

In an embodiment, FIG. 7B is a structural diagram of another information interaction apparatus according to embodiment seven of the present disclosure. The apparatus may further include an instruction reception module 530 and an operation performance module 540. The instruction reception module 530 is configured to receive an operation instruction for the sharing group. The operation performance module 540 is configured to perform an operation on the sharing group according to the operation instruction.

In an embodiment, the mail sharing request may further include an operation authority allocation instruction sent by the sharer party to the sharee party. Correspondingly, the apparatus may further include an authority allocation module. The authority allocation module is configured to after the mail sharing request sent by the sharer party based on the target mail is received, allocate a mail operation authority to the sharee party according to the operation authority allocation instruction.

In an embodiment, the instruction reception module 530 and the operation performance module 540 include a sharing revoking module. The sharing revoking module is configured to receive a group operation instruction sent by the sharer party or the sharee party, and revoke or partially revoke the mail operation authority of the sharee party according to the group operation instruction.

In an embodiment, the sharing revoking module may include a revoking instruction reception sub-module and a mail sharing revoking sub-module. The revoking instruction reception sub-module is configured to receive a mail sharing revoking instruction sent by the sharer party. The mail sharing revoking sub-module is configured to revoke the mail operation authority of the sharee party according to the mail sharing revoking instruction.

In an embodiment, the sharing revoking module may include a first instruction reception sub-module and a first sharing revoking sub-module. The first instruction reception sub-module is configured to receive a first group leaving operation instruction sent by the sharer party. The first sharing revoking sub-module is configured to remove the sharer party from the sharing group according to the first group leaving operation instruction, and revoke the mail operation authority of the sharee party in the sharing group.

In an embodiment, the sharing revoking module may include a second instruction reception sub-module and a second sharing revoking sub-module. The second instruction reception sub-module is configured to receive a group disbanding operation instruction sent by the sharer party. The second sharing revoking sub-module is configured to disband the sharing group according to the group disbanding operation instruction, and revoke the mail operation authority of the sharee party in the sharing group.

In an embodiment, the sharing revoking module may include a third instruction reception sub-module and a third sharing revoking sub-module. The third instruction reception sub-module is configured to receive a second group leaving operation instruction sent by a target sharee party. The third sharing revoking sub-module is configured to remove the target sharee party from the sharing group according to the second group leaving operation instruction, and revoke mail operation authority of the target sharee party.

In an embodiment, the sharing revoking module may include a fourth instruction reception sub-module and a fourth sharing revoking sub-module. The fourth instruction reception sub-module is configured to receive an ownership transfer instruction sent by the sharer party. The fourth sharing revoking sub-module is configured to transfer ownership of the sharer party and a group operation authority of the sharer party to a target group member in the sharing group according to the ownership transfer instruction, and revoke the mail operation authority of the sharee party in the sharing group.

In an embodiment, the sharing revoking module may further include an operation authority transfer sub-module. The operation authority transfer sub-module is configured to after the first group leaving operation instruction sent by the sharer party is received, transfer ownership of the sharer party and a group operation authority of the sharer party to a target group member in the sharing group according to an ownership transfer instruction sent by the sharer party or a preset transfer rule.

In an embodiment, the mail operation authority includes at least one of editing authority, reading authority or sharing authority.

In an embodiment, the apparatus may further include a re-sharing request reception module and a target mail re-sharing module. The re-sharing request reception module is configured to after the target mail is shared with the sharee party, receive a mail re-sharing request sent by the sharer party or the sharee party. The target mail re-sharing module is configured to share the target mail with a newly-added sharee party indicated by the mail re-sharing request according to the mail re-sharing request.

In an embodiment, the apparatus may further include a newly-added group member adding module. The newly-added group member adding module is configured to after the target mail is shared with the newly-added sharee party indicated by the mail re-sharing request, add the newly-added sharee party to the sharing group.

In an embodiment, the newly-added group member adding module may further include a history message display sub-module. The history message display sub-module is configured to after the newly-added sharee party indicated by the mail re-sharing request is added to the sharing group, start the sharing group in the newly-added sharee party, and display all corresponding history messages in the sharing group of the newly-added sharee party.

In an embodiment, the apparatus may further include a reception prohibiting module. The reception prohibiting module is configured to in a case of determining that the sharing group is in a state that only the sharer party is able to re-share, prohibit reception of the mail re-sharing request sent by the sharee party.

In an embodiment, the target mail includes at least one mail draft or multiple associated mails having the same feature information.

In an embodiment, the sharing group includes a discussion group at a mail terminal and/or an IM group at an IM terminal.

In an embodiment, the discussion group at the mail terminal displays a status bar for displaying group member information.

In an embodiment, the group member information includes at least one of the number of group members, a group member avatar or a group member adding identifier.

In an embodiment, the IM group at the IM terminal displays a group name associated with the target mail.

In an embodiment, the instruction reception module 530 may further include a starting instruction reception sub-module. The starting instruction reception sub-module is configured to receive a group joining verification starting instruction sent by the sharer party for the IM group. The operation performance module 540 may further include a verification interface providing sub-module. The verification interface providing sub-module is configured to provide a group verification interface in the IM group displayed in the sharer party to enable the sharer party to process a group verification message at the IM terminal.

In an embodiment, the instruction reception module 530 may further include a first silence instruction reception sub-module. The first silence instruction reception sub-module is configured to receive a group silence instruction sent for the discussion group. The operation performance module 540 may further include a first reminding manner switching sub-module. The first reminding manner switching sub-module is configured to switch a new message reminding manner of the discussion group from a first reminding manner to a second reminding manner. The first reminding manner includes at least one of the following: sound reminding, displaying a first reminding identifier based on a group icon of the discussion group or displaying a second reminding identifier based on the mail information of the target mail; and the second reminding manner includes displaying a third reminding identifier based on the group icon of the discussion group.

In an embodiment, the third reminding identifier includes a target reminding identifier selected from at least two selectable identifiers corresponding to the discussion group.

In an embodiment, the instruction reception module 530 may further include a second silence instruction reception sub-module. The second silence instruction reception sub-module is configured to receive a group silence instruction sent for the IM group. The operation performance module 540 may further include a second reminding manner switching sub-module.

The second reminding manner switching sub-module is configured to switch a new message reminding manner of the IM group from a third reminding manner to a fourth reminding manner. The third reminding manner includes sound reminding and/or displaying a fourth reminding identifier based on a message stream corresponding to the IM group; and the fourth reminding manner includes displaying a fifth reminding identifier based on the message stream corresponding to the IM group.

In an embodiment, the fifth reminding identifier includes a target reminding identifier selected from at least two selectable identifiers corresponding to the IM group.

The preceding products can execute the method provided by any embodiment of the present disclosure, and have functional modules and effects corresponding to the executed method.

Embodiment Eight

Figure 8:
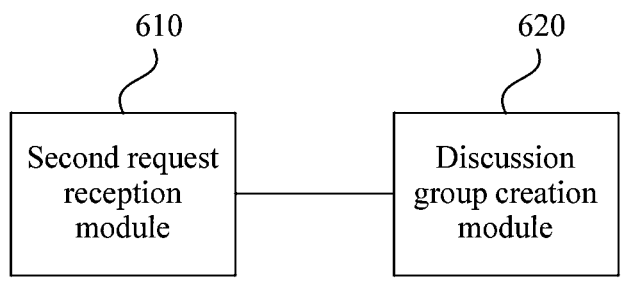
FIG. 8 is a structural diagram of an information interaction apparatus according to embodiment eight of the present disclosure.

FIG. 8 is a structural diagram of an information interaction apparatus according to embodiment eight of the present disclosure. Referring to FIG. 8, the information interaction apparatus includes a second request reception module 610 and a discussion group creation module 620. Multiple modules are described below.

The second request reception module 610 is configured to receive a mail sharing request sent by a sharer party based on a target mail. The discussion group creation module 620 is configured to create a discussion group including the sharer party and a sharee party at a mail terminal and share the target mail with the sharee party according to the mail sharing request, to enable the sharer party and the sharee party to perform, based on the target mail, information interaction in the discussion group.

According to the information interaction apparatus provided by the embodiment, the mail sharing request sent by the sharer party based on the target mail is received, and the discussion group including the sharer party and the sharee party is created at the mail terminal and the target mail is shared with the sharee party according to the mail sharing request, to enable the sharer party and the sharee party to perform information interaction in the discussion group based on the target mail. Communication is conducted in the group created based on the shared mail at the mail terminal, so that the problem is solved that in the related art, the mail is first forwarded to each sharee party, and then communication is conducted with multiple sharee parties one by one or an offline face-to-face meeting is held for discussion, leading to low information interaction efficiency. Therefore, the information interaction efficiency of multi-party collaborative communication is improved.

In an embodiment, the apparatus may further include a tag adding module. The tag adding module is configured to after the mail sharing request sent by the sharer party based on the target mail is received, add a sharing tag to the target mail, and display the sharing tag in association with the target mail.

In an embodiment, the tag adding module may be configured to display mail information of the target mail in a mail list in a sharing tab of the mail terminal, and/or mark, by using the sharing tag, the target mail displayed in another tab of the mail terminal.

In an embodiment, the discussion group creation module 620 may include a discussion group display sub-module. The discussion group display sub-module is configured to create the discussion group including the sharer party and the sharee party, and display, based on a display position of a mail content displaying window of the mail terminal, the discussion group including the sharer party and the sharee party, where the mail content displaying window is configured to expand and display a mail content of the target mail.

In an embodiment, the target mail displayed in the mail content displaying window is marked with a corresponding sharer party identifier.

In an embodiment, the discussion group creation module 620 may further include a group icon display sub-module. The group icon display sub-module is configured to after the discussion group including the sharer party and the sharee party is created and displayed based on the display position of the mail content displaying window of the mail terminal, display a discussion group icon in the mail content displaying window, where the discussion group icon is configured to, when triggered, enable the discussion group to pop up or hide.

In an embodiment, the discussion group creation module 620 may further include a reminding manner determination sub-module. The reminding manner determination sub-module is configured to after the discussion group including the sharer party and the sharee party is created and displayed based on the display position of the mail content displaying window of the mail terminal, determine a new message reminding manner of the discussion group according to a current display state of the discussion group.

In an embodiment, the reminding manner determination sub-module may include a non-silence reminding unit. The non-silence reminding unit is configured to in a case where the discussion group is currently in a hidden state and is in a non-silent mode, perform new message reminding in a first reminding manner based on the discussion group icon and/or the mail information of the target mail.

In an embodiment, the reminding manner determination sub-module may further include a silence reminding unit. The non-silence reminding unit is configured to in a case where the discussion group is currently in a hidden state and is in a silent mode, perform new message reminding in a second reminding manner based on the discussion group icon.

The preceding products can execute the method provided by any embodiment of the present disclosure, and has functional modules and effects corresponding to the executed method.

Embodiment Nine

Figure 9:
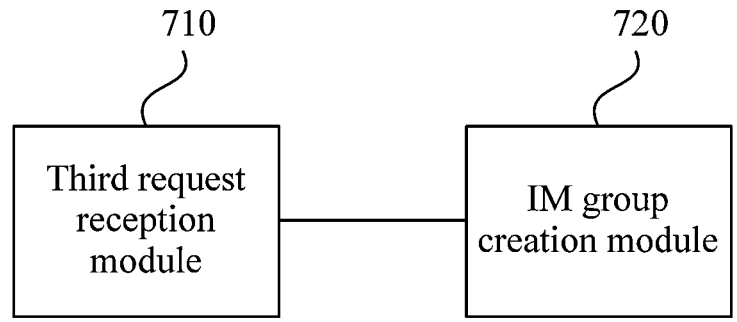
FIG. 9 is a structural diagram of an information interaction apparatus according to embodiment nine of the present disclosure.

FIG. 9 is a structural diagram of an information interaction apparatus according to embodiment nine of the present disclosure. Referring to FIG. 9, the information interaction apparatus includes a third request reception module 710 and an IM group creation module 720. Multiple modules are described below.

The third request reception module 710 is configured to receive a mail sharing request sent by a sharer party based on a target mail. The IM group creation module 720 is configured to create an IM group including the sharer party and a sharee party at an IM terminal and share the target mail with the sharee party according to the mail sharing request, to enable the sharer party and the sharee party to perform, based on the target mail, information interaction in the IM group.

According to the information interaction apparatus provided by the embodiment, the mail sharing request sent by the sharer party based on the target mail is received, and the IM group including the sharer party and the sharee party is created at the IM terminal and the target mail is shared with the sharee party according to the mail sharing request, to enable the sharer party and the sharee party to perform information interaction in the IM group based on the target mail. Communication is conducted in the group created based on the shared mail at the IM terminal, so that the problem is solved that in the related art, the mail is first forwarded to each sharee party, and then communication is conducted with multiple sharee parties one by one or an offline face-to-face meeting is held for discussion, leading to low information interaction efficiency. Therefore, the information interaction efficiency of multi-party collaborative communication is improved.

In an embodiment, the IM group creation module 720 may include a relationship establishment sub-module and an association displaying sub-module. The relationship establishment sub-module is configured to establish an association relationship between the target mail and a group identifier corresponding to the IM group. The association displaying sub-module is configured to display the IM group in association with the target mail according to the association relationship.

In an embodiment, the association displaying sub-module may include a mail information displaying unit and/or a mail content displaying unit. The mail information displaying unit is configured to display mail information of the target mail in a form of a mail card in the IM group. The mail content displaying unit is configured to construct a mail content displaying window based on a display position of the IM group, and expand and display a mail content of the target mail in the mail content displaying window.

In an embodiment, the association displaying sub-module may further include a triggering instruction reception unit. The triggering instruction reception unit is configured to before the mail content displaying window is constructed based on the display position of the IM group, and the mail content of the target mail is expanded and displayed in the mail content displaying window, determine that an operation triggering instruction for the mail card is received.

The preceding products can execute the method provided by any embodiment of the present disclosure, and has functional modules and effects corresponding to the executed method.

Embodiment Ten

Figure 10:
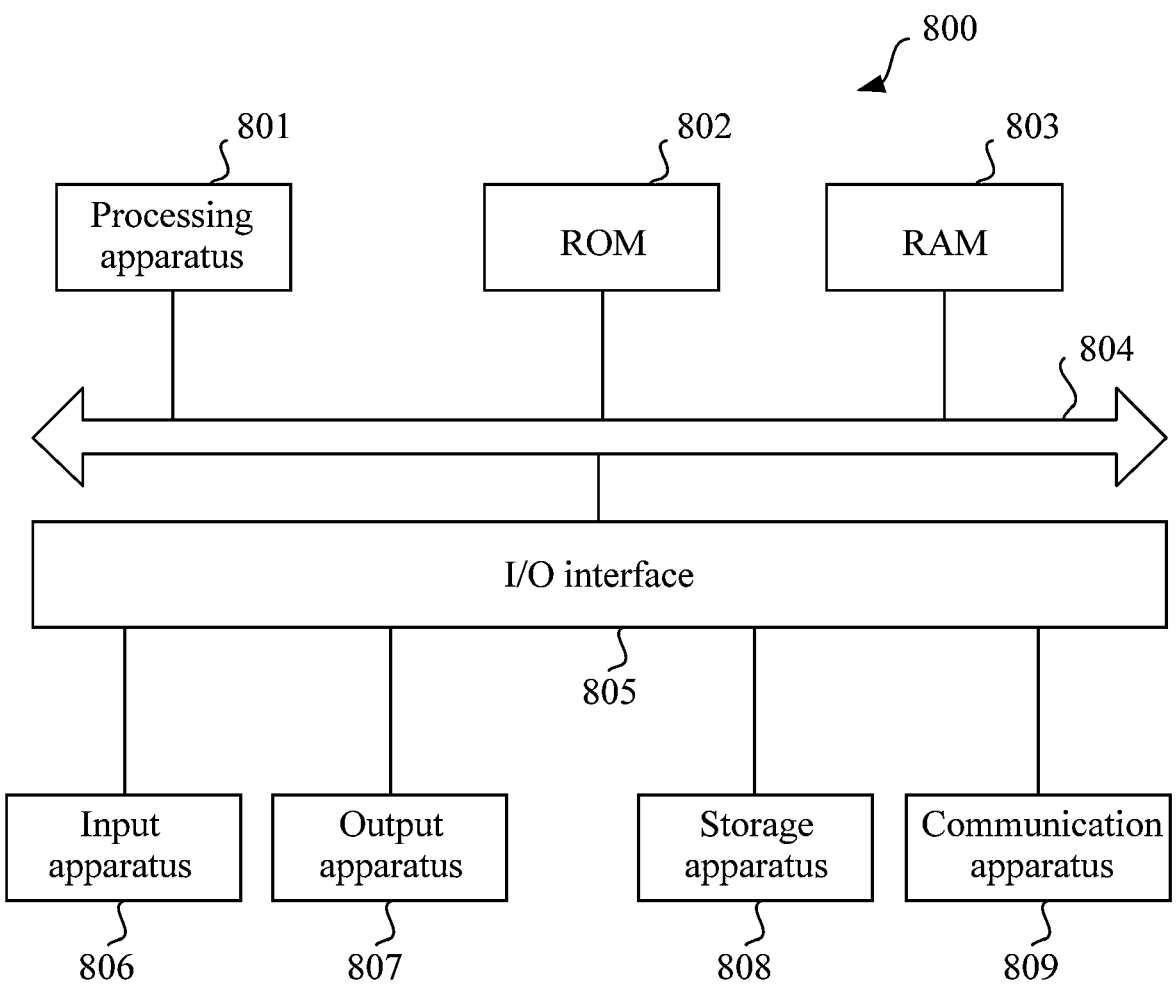
FIG. 10 is a schematic diagram showing the hardware structure of an electronic device according to embodiment ten of the present disclosure.

FIG. 10 shows a structural diagram of an electronic device 800 for implementing an embodiment of the present disclosure. Electronic devices in the embodiments of the present disclosure are intended to represent various forms of digital computers, for example, laptop computers, desktop computers, worktables, personal digital assistants, servers, blade servers, mainframe computers and other applicable computers. The electronic device shown in FIG. 10 is merely an example and is not intended to limit the function and usage scope of the embodiments of the present disclosure.

As shown in FIG. 10, the electronic device 800 may include a processing apparatus (such as a central processing unit and a graphics processing unit) 801. The processing apparatus 801 may execute, according to a program stored in a read-only memory (ROM) 802 or a program loaded from a storage apparatus 808 into a random-access memory (RAM) 803, various appropriate actions and processing. The RAM 803 also stores various programs and data required for the operation of the electronic device 800. The processing apparatus 801, the ROM 802 and the RAM 803 are connected to each other through a bus 804. An input/output (I/O) interface 805 is also connected to the bus 804.

Generally, the following apparatuses may be connected to the I/O interface 805: an input apparatus 806 including such as a touch screen, a touch pad, a keyboard, a mouse, a camera, a microphone, an accelerometer and a gyroscope; an output apparatus 807 including such as a liquid crystal display (LCD), a speaker and a vibrator; a storage apparatus 808 including such as a magnetic tape and a hard disk; and a communication apparatus 809. The communication apparatus 809 may allow the electronic device 800 to perform wireless or wired communication with other devices to exchange data. Although FIG. 10 illustrates the electronic device 800 having various apparatuses, it is to be understood that it is not required to implement or have all the illustrated apparatuses. Alternatively, more or fewer apparatuses may be implemented or present.

According to the embodiment of the present disclosure, the processes described above with reference to the flowcharts may be implemented as computer software programs. For example, the embodiment of the present disclosure includes a computer program product. The computer program product includes a computer program carried in a computer-readable medium. The computer program includes program codes for executing the method shown in the flowcharts. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the method of the embodiments of the present disclosure are performed.

The computer-readable medium described above in the present disclosure may be a computer-readable signal medium or a non-transitory computer-readable storage medium or any combination thereof. The computer-readable storage medium may be, but not limited to, an electrical, magnetic, optical, electromagnetic, infrared or semiconductor system, apparatus or device, or any combination thereof. Examples of the computer-readable storage medium may include, but are not limited to, an electrical connection having one or more wires, a portable computer disk, a hard disk, an RAM, an ROM, an erasable programmable read-only memory (EPROM) or flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a base band or as a part of a carrier wave, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate or transmit a program used by or in conjunction with an instruction execution system, apparatus or device. The program codes included in the computer-readable medium may be transmitted in any suitable medium, including, but not limited to, a wire, an optical cable, a radio frequency (RF), or any suitable combination thereof.

The preceding computer-readable medium may be included in the electronic device or may exist alone without being assembled into the electronic device.

The preceding computer-readable medium carries one or more programs which, when executed by the electronic device, cause the electronic device to perform: receiving a mail sharing request sent by a sharer party based on a target mail; and creating a sharing group including the sharer party and a sharee party and sharing the target mail with the sharee party according to the mail sharing request, to enable the sharer party and the sharee party to perform, based on the target mail, information interaction in the sharing group.

Alternatively, the preceding computer-readable medium carries one or more programs which, when executed by the electronic device, cause the electronic device to perform: receiving a mail sharing request sent by a sharer party based on a target mail; and creating a discussion group including the sharer party and a sharee party at a mail terminal and sharing the target mail with the sharee party according to the mail sharing request, to enable the sharer party and the sharee party to perform, based on the target mail, information interaction in the discussion group.

Alternatively, the preceding computer-readable medium carries one or more programs which, when executed by the electronic device, cause the electronic device to perform: receiving a mail sharing request sent by a sharer party based on a target mail; and creating an IM group including the sharer party and a sharee party at an IM terminal and sharing the target mail with the sharee party according to the mail sharing request, to enable the sharer party and the sharee party to perform, based on the target mail, information interaction in the IM group.

Computer program codes for performing the operations of the present disclosure may be compiled in one or more programming languages or combinations thereof. The one or more programming languages include object-oriented programming languages such as Java, Smalltalk, C++ and conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions and operations of the system, method and computer program product according to the multiple embodiments of the present disclosure. In this regard, each block in the flowcharts or block diagrams may represent one module, program segment or part of codes. The module, program segment or part of codes includes one or more executable instructions for implementing specified logical functions. In some alternative implementations, the functions marked in the blocks may occur in an order different from those marked in the drawings. For example, two successive blocks may in fact be executed substantially in parallel or in reverse order, which depends on the functions involved. Each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The modules or units involved in the embodiments of the present disclosure may be implemented by software or hardware. The names of the modules or units do not constitute a limitation to the modules or units themselves. For example, the first request reception module may also be described as a "module configured to receive a mail sharing request sent by a sharer party based on a target mail".

What is claimed is:

1. An information interaction method, comprising:
receiving a mail sharing request that is sent by a sharer party based on a target mail at a mail application; and
performing, according to the mail sharing request that is sent by the sharer party based on the target mail at the mail application, both of creating a sharing group comprising the sharer party and a sharee party and sharing the target mail with the sharee party, to enable the sharer party and the sharee party to perform information interaction in the sharing group, wherein the sharing group comprises an instant messaging (IM) group at an 1M application, and the information interaction comprises at least one of text interaction, voice interaction, video interaction or collaborative editing,
wherein the mail sharing request comprises: a sharer party identifier and a sharee party identifier;
wherein creating the sharing group comprising the sharer party and the sharee party comprises:
creating the sharing group comprising the sharer party and the sharee party according to the sharer party identifier and the sharee party identifier, wherein the sharing group is allocated with a group identifier corresponding to the sharing group; and
sending the group identifier to the sharer party and the sharee party to enable the sharer party and the sharee party to acquire, according to the group identifier, a group message of the sharing group in real time; and
wherein after sharing the target mail with the sharee party, the method further comprises:

receiving a mail re-sharing request sent by the sharer party or the sharee party; and sharing, according to the mail re-sharing request, the target mail with a newly-added sharee party indicated by the mail re-sharing request.

2. The method according to claim 1, wherein after sending the group identifier to the sharer party and the sharee party, the method further comprises at least one of the following:

starting, according to the group identifier, the sharing group in the sharer party and the sharee party respectively; or starting the sharing group in the sharer party according to the group identifier; and displaying a sharing group creation prompt on the sharee party, wherein the sharing group creation prompt is used for prompting the sharee party that a new sharing group is created; and starting the sharing group in the sharee party after receiving a viewing operation instruction of the sharee party.

3. The method according to claim 1, wherein after sharing the target mail with the sharee party, the method further comprises:

displaying the target mail to at least one of the sharer party or the sharee party.

4. The method according to claim 3, wherein displaying the target mail comprises at least one of the following:

displaying mail information of the target mail in a form of a mail card in the sharing group; or constructing a mail content displaying window, and expanding and displaying a mail content of the target mail in the mail content displaying window.

5. The method according to claim 1, further comprising: receiving an operation instruction for the sharing group; and performing an operation on the sharing group according to the operation instruction.

6. The method according to claim 5, wherein the target mail comprises at least one mail draft or a plurality of associated mails having same feature information; or wherein the sharing group further comprises a discussion group at a mail application.

7. The method according to claim 6, wherein when the sharing group further comprises the discussion group at the mail application, the discussion group at the mail application displays a status bar for displaying group member information; and the group member information comprises: at least one of a number of group members, a group member avatar or a group member adding identifier; and wherein the IM group at the IM application displays a group name associated with the target mail.

8. The method according to claim 6, wherein receiving the operation instruction for the sharing group comprises at least one of the following:

receiving a group joining verification starting instruction sent by the sharer party for the IM group; and wherein performing the operation on the sharing group according to the operation instruction comprises: providing a group verification interface in the IM group displayed in the sharer party to enable the sharer party to process a group verification message at the IM application;

when the sharing group further comprises the discussion group at the mail terminal application, receiving a group silence instruction sent for the discussion group; and wherein performing the operation on the sharing group according to the operation instruction comprises:

switching a new message reminding manner of the discussion group from a first reminding manner to a second reminding manner; wherein the first reminding manner comprises at least one of the following: sound reminding, displaying a first reminding identifier based on a group icon of the discussion group or displaying a second reminding identifier based on the mail information of the target mail; and the second reminding manner comprises displaying a third reminding identifier based on the group icon of the discussion group; or receiving a group silence instruction sent for the IM group; and wherein performing the operation on the sharing group according to the operation instruction comprises: switching a new message reminding manner of the IM group from a third reminding manner to a fourth reminding manner; wherein the third reminding manner comprises at least one of the following:

sound reminding or displaying a fourth reminding identifier based on a message stream corresponding to the IM group; and the fourth reminding manner comprises displaying a fifth reminding identifier based on the message stream corresponding to the IM group.

9. The method according to claim 8, wherein when performing the operation on the sharing group according to the operation instruction comprises:

switching the new message reminding manner of the discussion group from the first reminding manner to the second reminding manner, the third reminding identifier comprises a target reminding identifier selected from at least two selectable identifiers corresponding to the discussion group.

10. The method according to claim 8, wherein when performing the operation on the sharing group according to the operation instruction comprises:

switching the new message reminding manner of the IM group from the third reminding manner to the fourth reminding manner, the fifth reminding identifier comprises a target reminding identifier selected from at least two selectable identifiers corresponding to the IM group.

11. The method according to claim 1, wherein the mail sharing request comprises an operation authority allocation instruction sent by the sharer party to the sharee party; and wherein after receiving the mail sharing request sent by the sharer party based on the target mail, the method further comprises:

allocating a mail operation authority to the sharee party according to the operation authority allocation instruction.

12. The method according to claim 11, wherein receiving the operation instruction for the sharing group; and performing the operation on the sharing group according to the operation instruction comprises:

receiving a group operation instruction sent by the sharer party or the sharee party, and revoking or partially revoking the mail operation authority of the sharee party according to the group operation instruction; and wherein the mail operation authority comprises: at least one of an editing authority, a reading authority or a sharing authority.

13. The method according to claim 12, wherein receiving the group operation instruction sent by the sharer party or the sharee party, and revoking or partially revoking the mail operation authority of the sharee party according to the group operation instruction comprises at least one of the following:

receiving a mail sharing revoking instruction sent by the sharer party; and revoking the mail operation authority of the sharee party according to the mail sharing revoking instruction;

receiving a first group leaving operation instruction sent by the sharer party; and removing the sharer party from the sharing group according to the first group leaving operation instruction, and revoking the mail operation authority of the sharee party in the sharing group;

and wherein after receiving the first group leaving operation instruction sent by the sharer party, the method further comprises: transferring ownership of the sharer party and group operation authority of the sharer party to a target group member in the sharing group according to an ownership transfer instruction sent by the sharer party or a preset transfer rule;

receiving a group disbanding operation instruction sent by the sharer party; and disbanding the sharing group according to the group disbanding operation instruction, and revoking the mail operation authority of the sharee party in the sharing group;

receiving a second group leaving operation instruction sent by a target sharee party; and removing the target sharee party from the sharing group according to the second group leaving operation instruction, and revoking a mail operation authority of the target sharee party; or receiving an ownership transfer instruction sent by the sharer party; and transferring ownership of the sharer party and a group operation authority of the sharer party to a target group member in the sharing group according to the ownership transfer instruction, and revoking the mail operation authority of the sharee party in the sharing group.

14. The method according to claim 1, wherein after sharing the target mail with the newly-added sharee party indicated by the mail re-sharing request, the method further comprises: adding the newly-added sharee party to the sharing group.

15. The method according to claim 14, wherein after adding the newly-added sharee party to the sharing group, the method further comprises at least one of:

starting the sharing group in the newly-added sharee party, and displaying all history messages corresponding to the sharing group in the sharing group of the newly-added sharee party; or in a case of determining that the sharing group is in a state that only the sharer party is able to re-share, prohibiting reception of the mail re-sharing request sent by the sharee party.

16. The method according to claim 1, wherein the sharing group further comprises a discussion group at a mail application; and wherein creating the sharing group comprising the sharer party and the sharee party and sharing the target mail with the sharee party according to the mail sharing request, to enable the sharer party and the sharee party to perform the information interaction in the sharing group comprises:

creating the discussion group comprising the sharer party and the sharee party at the mail application and sharing the target mail with the sharee party according to the mail sharing request, to enable the sharer party and the sharee party to perform information interaction in the discussion group.

17. The method according to claim 16, wherein after receiving the mail sharing request sent by the sharer party based on the target mail, the method further comprises:

adding a sharing tag to the target mail, and displaying the sharing tag in association with the target mail.

18. The method according to claim 17, wherein displaying the sharing tag in association with the target mail comprises at least one of the following:

displaying mail information of the target mail in a mail list in a sharing tab of the mail application; or marking, by using the sharing tag, the target mail displayed in another tab of the mail application other than the sharing tab.

19. The method according to claim 18, wherein creating the discussion group comprising the sharer party and the sharee party at the mail application comprises:

creating the discussion group comprising the sharer party and the sharee party, and displaying, based on a display position of a mail content displaying window of the mail application, the discussion group comprising the sharer party and the sharee party, wherein the mail content displaying window is configured to expand and display a mail content of the target mail.

20. The method according to claim 19, wherein the target mail displayed in the mail content displaying window is marked with a sharer party identifier corresponding to the target mail.

21. The method according to claim 19, wherein after creating the discussion group comprising the sharer party and the sharee party, and displaying, based on the display position of the mail content displaying window of the mail application, the discussion group comprising the sharer party and the sharee party, the method further comprises:

displaying a discussion group icon in the mail content displaying window, wherein the discussion group icon is configured to, when triggered, enable the discussion group to pop up or hide.

22. The method according to claim 21, wherein after creating the discussion group comprising the sharer party and the sharee party, and displaying, based on the display position of the mail content displaying window of the mail application, the discussion group comprising the sharer party and the sharee party, the method further comprises:

determining a new message reminding manner of the discussion group according to a display state of the discussion group.

23. The method according to claim 22, wherein determining the new message reminding manner of the discussion group according to the display state of the discussion group comprises: in a case where the discussion group is in a hidden state and is in a non-silent mode, performing, based on at least one of the discussion group icon or the mail information of the target mail, new message reminding in a first reminding manner; or in a case where the discussion group is in a hidden state and is in a silent mode, performing, based on the discussion group icon, new message reminding in a second reminding manner.

24. The method according to claim 1, wherein creating the sharing group comprising the sharer party and the sharee party and sharing the target mail with the sharee party according to the mail sharing request, to enable the sharer party and the sharee party to perform the information interaction in the sharing group comprises:

creating the IM group comprising the sharer party and the sharee party at the IM application and sharing the target mail with the sharee party according to the mail sharing request, to enable the sharer party and the sharee party to perform, based on the target mail, information interaction in the IM group.

25. The method according to claim 24, wherein sharing the target mail with the sharee party comprises:
   establishing an association relationship between the target mail and a group identifier corresponding to the IM group; and
   displaying the IM group in association with the target mail according to the association relationship; and
   wherein displaying the IM group in association with the target mail comprises at least one of the following:
   displaying mail information of the target mail in a form of a mail card in the IM group;
   or
   constructing a mail content displaying window based on a display position of the IM group, and expanding and displaying a mail content of the target mail in the mail content displaying window.

26. The method according to claim 25, wherein before constructing the mail content displaying window based on the display position of the IM group, and expanding and displaying the mail content of the target mail in the mail content displaying window, the method further comprises:
   determining that a triggering operation instruction for the mail card is received.

27. An information interaction apparatus, comprising: at least one processor; and
   a storage apparatus configured to store at least one program;
   wherein the at least one program, when executed by the at least one processor, causes the at least one processor comprising:
   a request reception module, which is configured to receive a mail sharing request that is sent by a sharer party based on a target mail at a mail application; and
   a sharing group creation module, which is configured to perform, according to the mail sharing request that is sent by the sharer party based on the target mail at the mail application, both of creating a sharing group comprising the sharer party and a sharee party and sharing the target mail with the sharee party, to enable the sharer party and the sharee party to perform information interaction in the sharing group, wherein the sharing group comprises an instant messaging (IM) group at an IM application, and the information interaction comprises at least one of text interaction, voice interaction, video interaction or collaborative editing, wherein the mail sharing request comprises: a sharer party identifier and a sharee party identifier, wherein creating the sharing group comprising the sharer party and the sharee party comprises:
   creating the sharing group comprising the sharer party and the sharee party according to the sharer party identifier and the sharee party identifier, wherein the sharing group is allocated with a group identifier corresponding to the sharing group; and
   sending the group identifier to the sharer party and the sharee party to enable the sharer party and the sharee party to acquire, according to the group identifier, a group message of the sharing group in real time; and
   wherein after sharing the target mail with the sharee party, the sharing group creation module is further configured to perform:
   receiving a mail re-sharing request sent by the sharer party or the sharee party; and
   sharing, according to the mail re-sharing request, the target mail with a newly-added sharee party indicated by the mail re-sharing request.

28. A non-transitory computer-readable storage medium storing a computer program, wherein the computer program, when executed by a processing apparatus, implements:
   receiving a mail sharing request that is sent by a sharer party based on a target mail at a mail application; and
   performing, according to the mail sharing request that is sent by the sharer party based on the target mail at the mail application, both of creating a sharing group comprising the sharer party and a sharee party and sharing the target mail with the sharee party, to enable the sharer party and the sharee party to perform information interaction in the sharing group, wherein the sharing group comprises an instant messaging (IM) group at an IM application, and the information interaction comprises at least one of text interaction, voice interaction, video interaction or collaborative editing;
   wherein the mail sharing request comprises: a sharer party identifier and a sharee party identifier;
   wherein creating the sharing group comprising the sharer party and the sharee party comprises:
   creating the sharing group comprising the sharer party and the sharee party according to the sharer party identifier and the sharee party identifier, wherein the sharing group is allocated with a group identifier corresponding to the sharing group; and
   sending the group identifier to the sharer party and the sharee party to enable the sharer party and the sharee party to acquire, according to the group identifier, a group message of the sharing group in real time; and
   wherein after sharing the target mail with the sharee party, the computer program, when executed by the processing apparatus, further implements:
   receiving a mail re-sharing request sent by the sharer party or the sharee party; and
   sharing, according to the mail re-sharing request, the target mail with a newly-added sharee party indicated by the mail re-sharing request.

* * * * *